(12) United States Patent
Yamagishi et al.

(10) Patent No.: US 11,168,518 B2
(45) Date of Patent: Nov. 9, 2021

(54) BRAKING DEVICE, AND SHIELDING DEVICE USING SAME

(71) Applicant: TACHIKAWA CORPORATION, Tokyo (JP)

(72) Inventors: Kazuto Yamagishi, Tokyo (JP); Takatoshi Uematsu, Tokyo (JP); Takenobu Ebato, Tokyo (JP); Nobutoshi Orita, Tokyo (JP); Daisuke Takahashi, Tokyo (JP)

(73) Assignee: TACHIKAWA CORPORATION, Tokyo (JP)

( * ) Notice: Subject to any disclaimer, the term of this patent is extended or adjusted under 35 U.S.C. 154(b) by 355 days.

(21) Appl. No.: 15/579,773

(22) PCT Filed: May 19, 2016

(86) PCT No.: PCT/JP2016/064949
§ 371 (c)(1),
(2) Date: Dec. 5, 2017

(87) PCT Pub. No.: WO2016/194642
PCT Pub. Date: Dec. 8, 2016

(65) Prior Publication Data
US 2018/0171706 A1 Jun. 21, 2018

(30) Foreign Application Priority Data
Jun. 5, 2015 (JP) .............................. JP2015-115244

(51) Int. Cl.
*E06B 9/324* (2006.01)
*E06B 9/322* (2006.01)
(Continued)

(52) U.S. Cl.
CPC .............. *E06B 9/322* (2013.01); *E06B 9/323* (2013.01); *E06B 9/324* (2013.01); *F16D 63/008* (2013.01);
(Continued)

(58) Field of Classification Search
CPC . E06B 9/32; E06B 9/322; E06B 9/324; E06B 9/323; A47H 3/04; F16D 2125/50;
(Continued)

(56) References Cited

U.S. PATENT DOCUMENTS 4,443,915 A 4/1984 Niemeyer
5,173,067 A * 12/1992 Biba ...................... B63C 11/26
242/156

(Continued)

FOREIGN PATENT DOCUMENTS

JP S56-070094 U 6/1981
JP H01-100898 U 7/1989
(Continued)

OTHER PUBLICATIONS

Extended European Search Report dated Aug. 1, 2018, including a Supplementary European Search Report and European Search Opinion, in connection with corresponding EP Application No. 16803077.3 (9 pgs.).

(Continued)

Primary Examiner — Daniel P Cahn
(74) Attorney, Agent, or Firm — Maier & Maier, PLLC

(57) ABSTRACT

Provided is a braking device configured to release a cord in a non-bent state so that the operation force required to pull cords is reduced and the behavior of slats is stabilized during an automatic fall, and a sunlight shielding device using the braking device. A braking device for braking movement of a cord includes a movement converter configured to convert movement of a cord into movement of another member. The (Continued)

movement converter includes sandwiching object configured to allow the cord to be sandwiched. The sandwiching object is configured to change a sandwiched state so that the cord is sandwiched by the sandwiching object when the cord and the sandwiching object move relatively in one direction and the cord is released in a non-bent state when the cord and the sandwiching object move relatively in another direction.

12 Claims, 23 Drawing Sheets

(51) Int. Cl.
E06B 9/323 (2006.01)
F16D 63/00 (2006.01)
F16D 121/14 (2012.01)
F16D 125/50 (2012.01)

(52) U.S. Cl.
CPC ...... F16D 2121/14 (2013.01); F16D 2125/50 (2013.01)

(58) Field of Classification Search
CPC F16D 63/008; F16D 2121/14; B65H 75/4439
USPC ........................................................ 242/156
See application file for complete search history.

(56) References Cited

U.S. PATENT DOCUMENTS

| | | | |
|---|---|---|---|
| 2002/0088562 A1* | 7/2002 | Palmer | E06B 9/90 160/170 |
| 2008/0041535 A1 | 2/2008 | Judkins et al. | |
| 2009/0120593 A1* | 5/2009 | Lesperance | E06B 9/322 160/84.02 |
| 2011/0290429 A1* | 12/2011 | Cheng | E06B 9/322 160/84.02 |
| 2014/0158012 A1* | 6/2014 | Hackett | F16D 63/008 104/113 |
| 2016/0243458 A1* | 8/2016 | Heath | F16D 63/008 |

FOREIGN PATENT DOCUMENTS

| | | | | |
|---|---|---|---|---|
| JP | H04242613 A | 8/1992 | | |
| JP | H0649693 U | 7/1994 | | |
| JP | H07217336 A | 8/1995 | | |
| JP | H10-140950 A | 5/1998 | | |
| JP | 2914845 B2 | 7/1999 | | |
| JP | 2603932 Y2 | 4/2000 | | |
| JP | 3069442 U | 6/2000 | | |
| JP | 2002-191494 A | 7/2002 | | |
| JP | 2005-030084 A | 2/2005 | | |
| JP | 2005-282071 A | 10/2005 | | |
| JP | 2009-091777 A | 4/2009 | | |
| JP | 5148954 B2 | 2/2013 | | |
| WO | 2009-G53151 | * | 4/2009 | E06B 9/324 |
| WO | 2011/075106 A1 | 6/2011 | | |

OTHER PUBLICATIONS

International Search Report dated Aug. 16, 2016 of corresponding International application No. PCT/JP2016/064949; 7 pgs.
Office Action dated Mar. 3, 2020 in corresponding Japanese Application No. 2017-521805; 14 pages including English-language translation.
Office Action dated Mar. 10, 2020 in corresponding Japanese Application No. 2017-521806; 10 pages including English-language translation.
Japanese Office Action dated Apr. 7, 2020, in connection with corresponding JP Application No. 2017-521804 (9 pgs., including machine-generated English translation).
Japanese Office Action dated Aug. 31, 2021, in connection with corresponding JP Application No. 2020-180370 (11 pp., including machine-generated English translation).

* cited by examiner

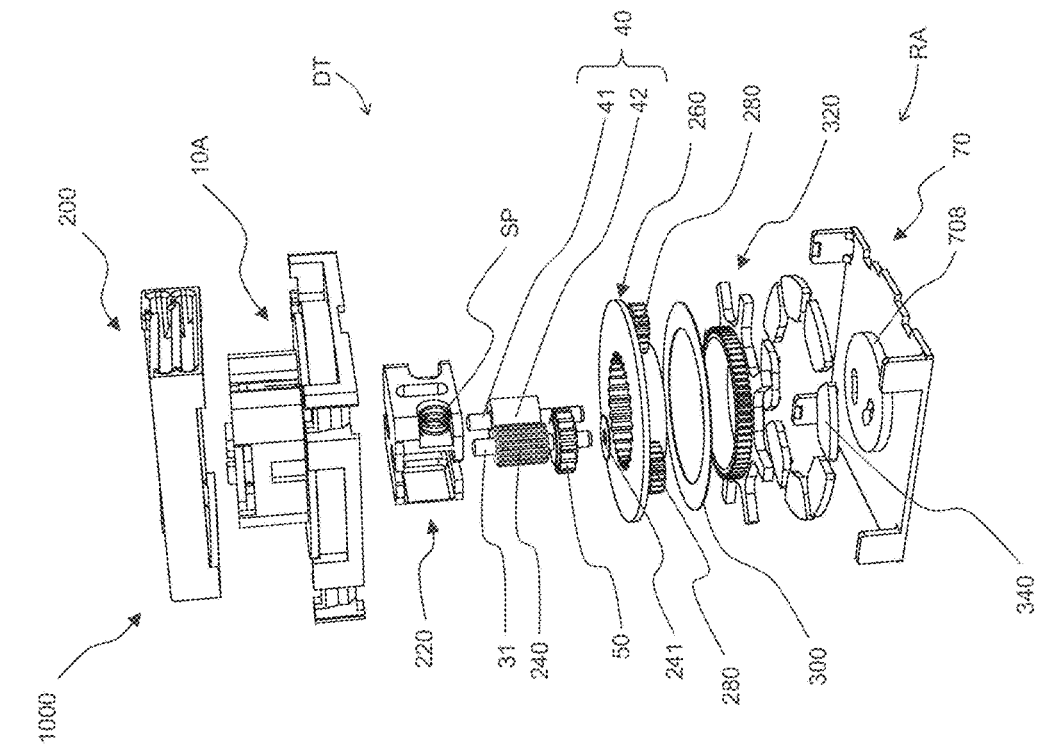
Fig. 2A EXPLODED PERSPECTIVE VIEW SEEN FROM FRONT-UPPER SIDE
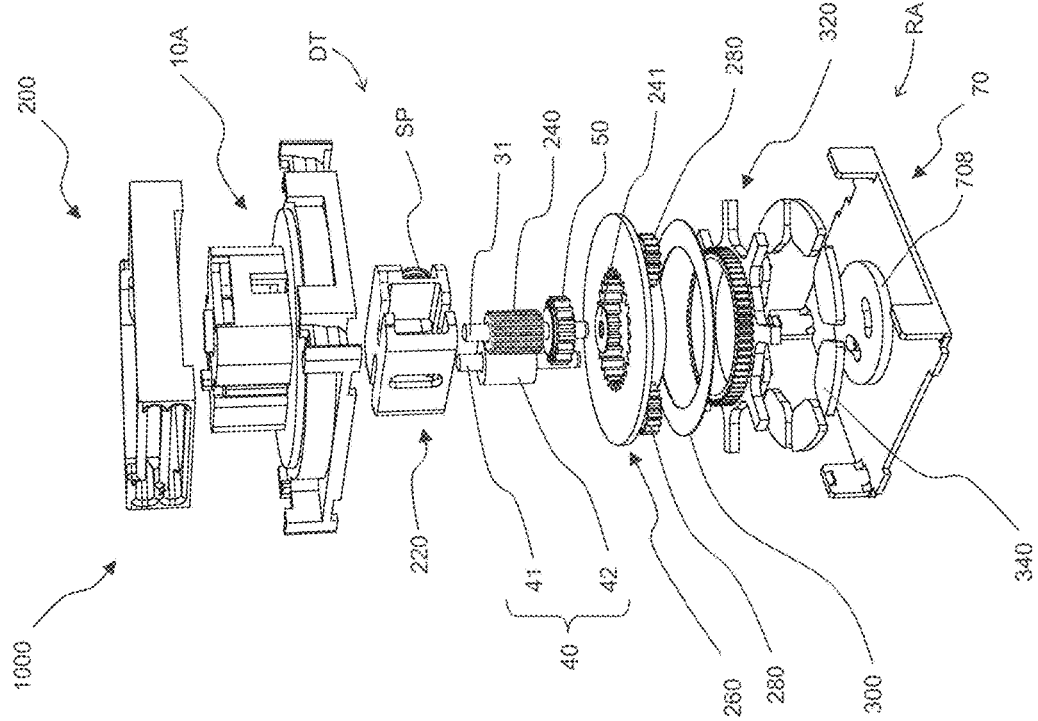
Fig. 2B EXPLODED PERSPECTIVE VIEW SEEN FROM REAR-UPPER SIDE

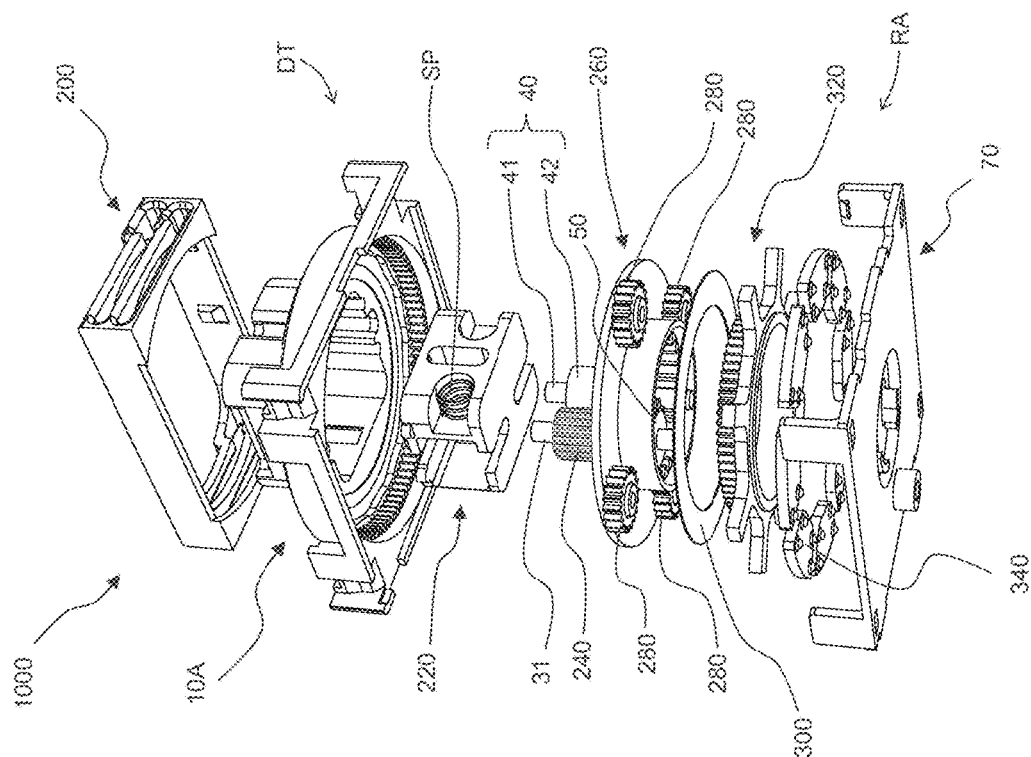
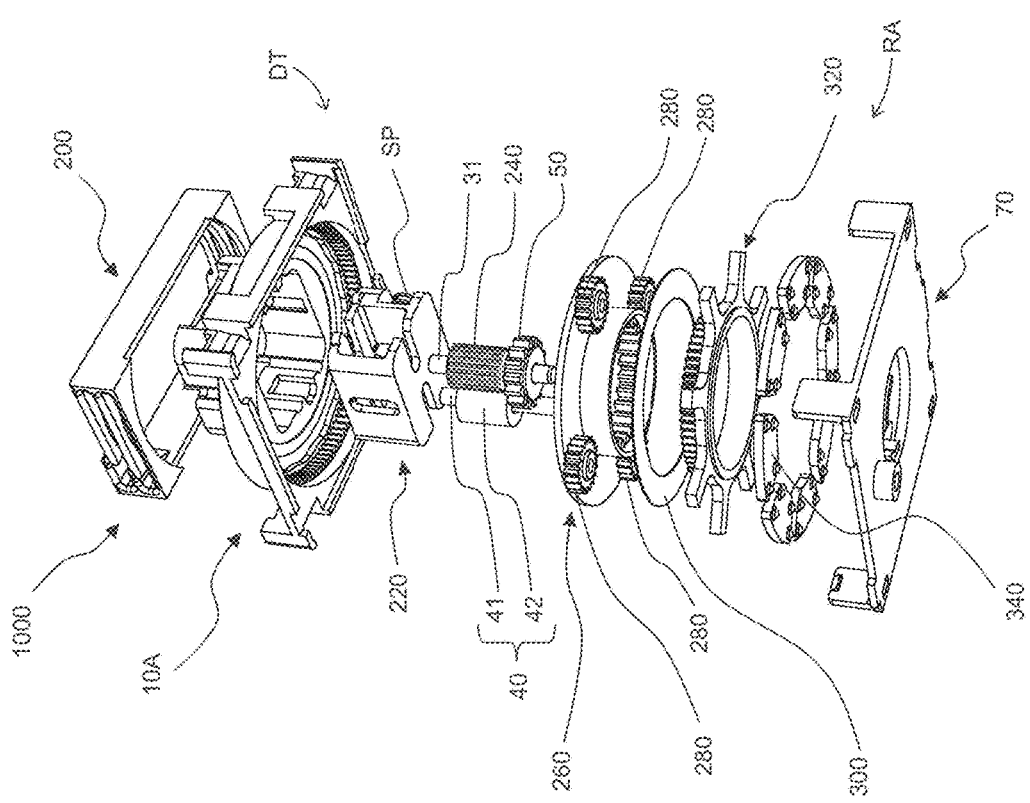

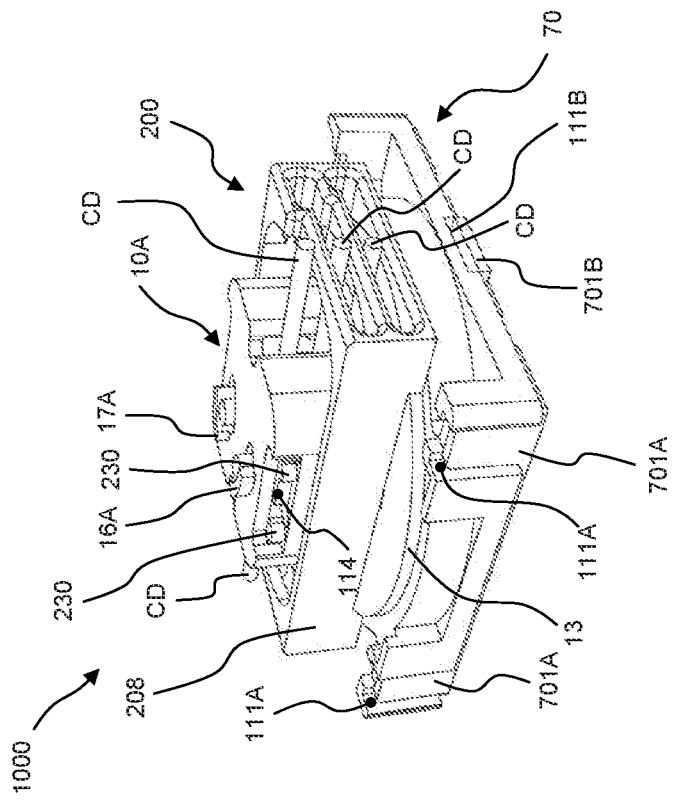
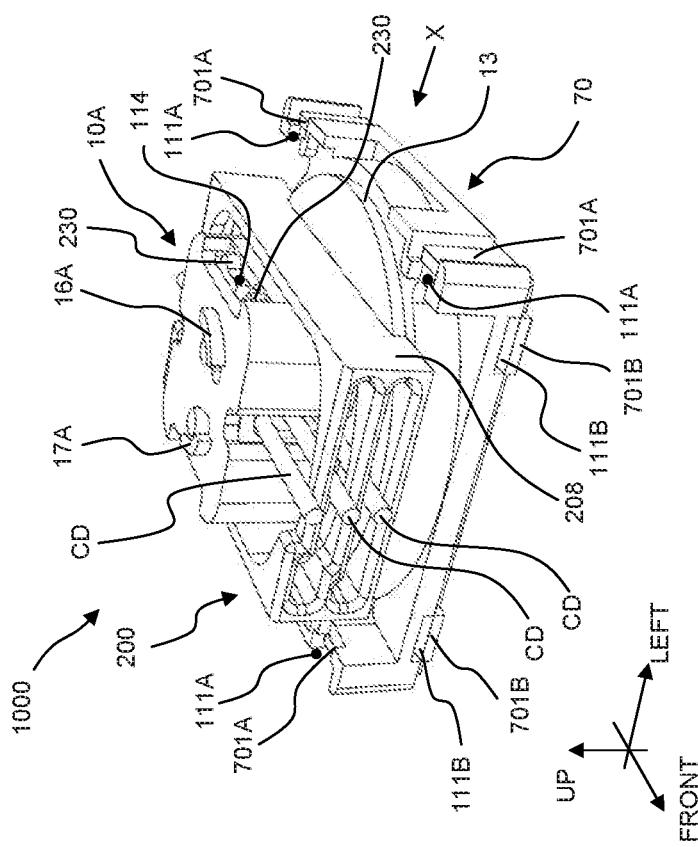

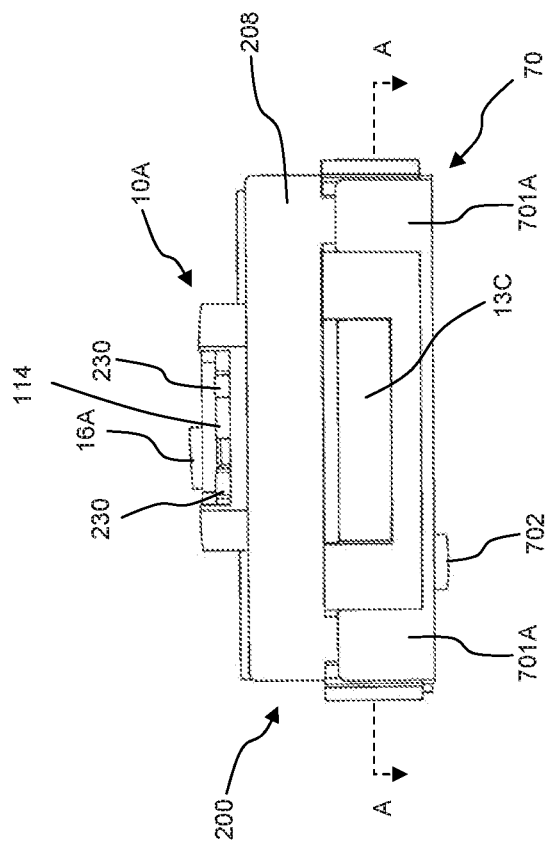

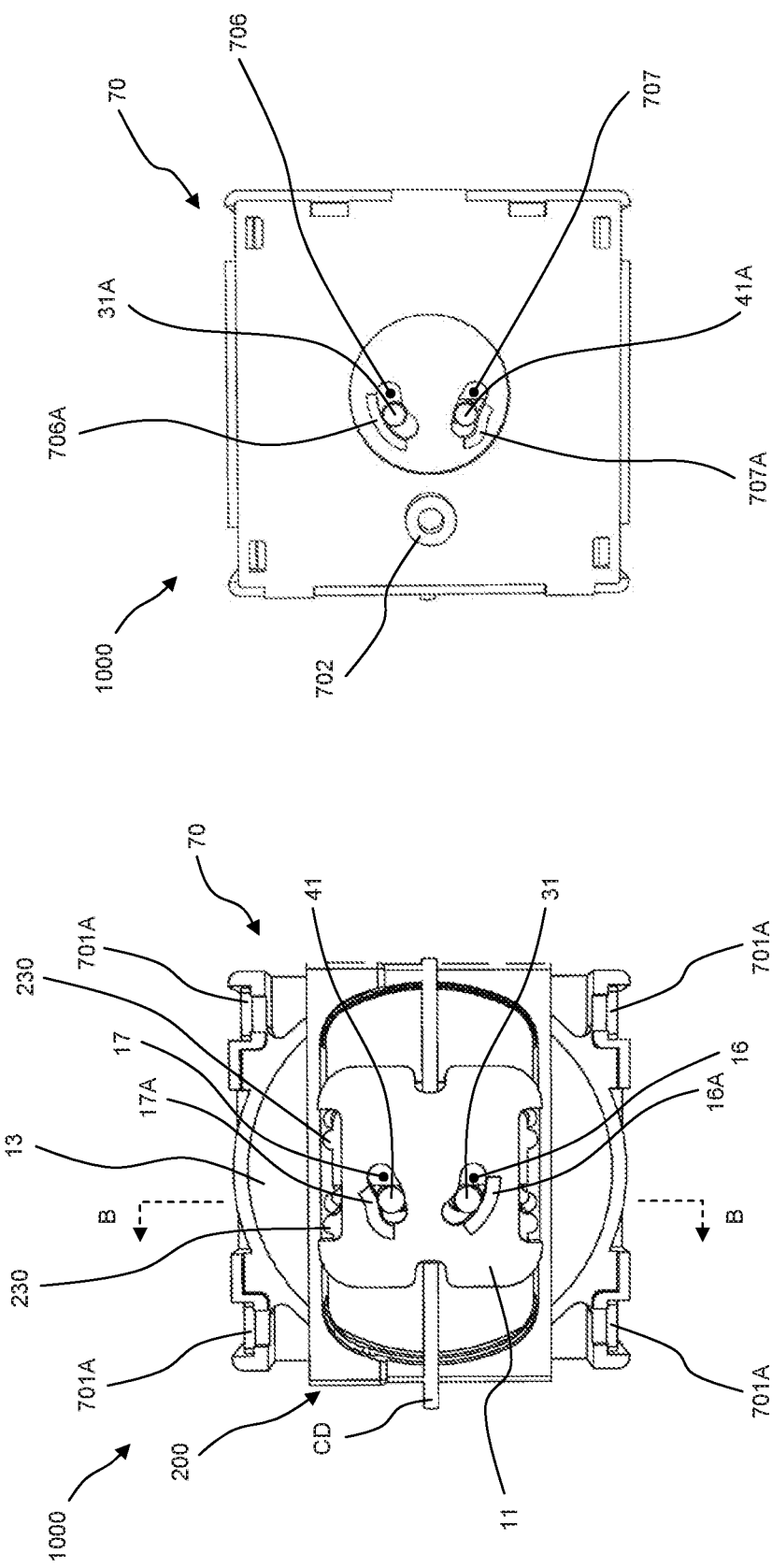

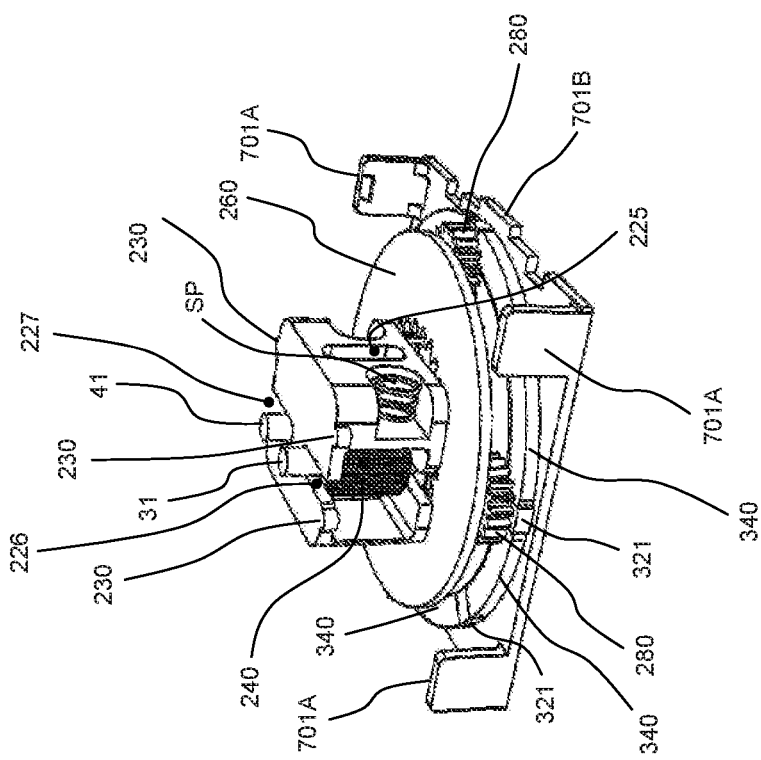
Fig. 7B REAR PERSPECTIVE VIEW
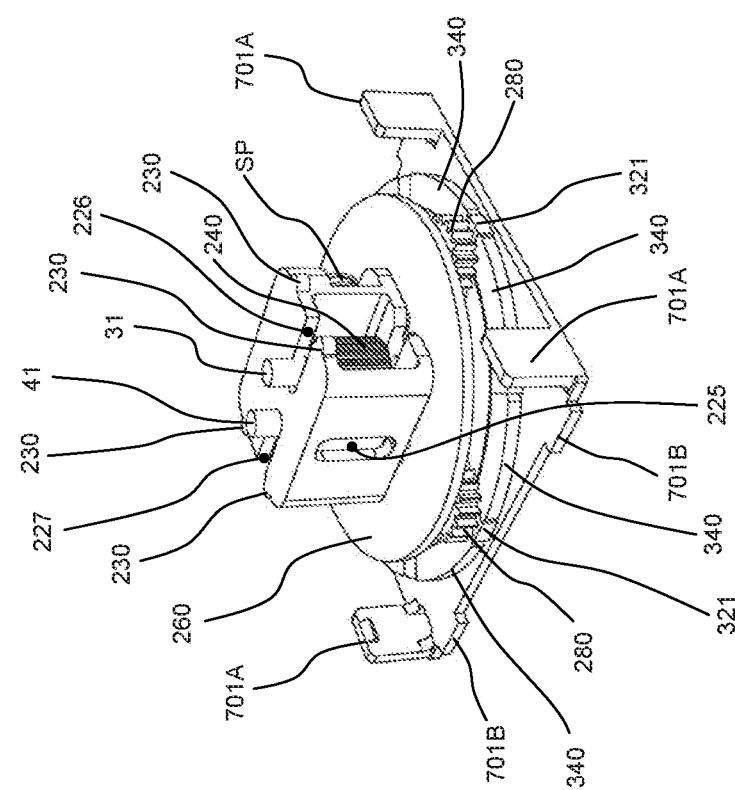
Fig. 7A FRONT PERSPECTIVE VIEW

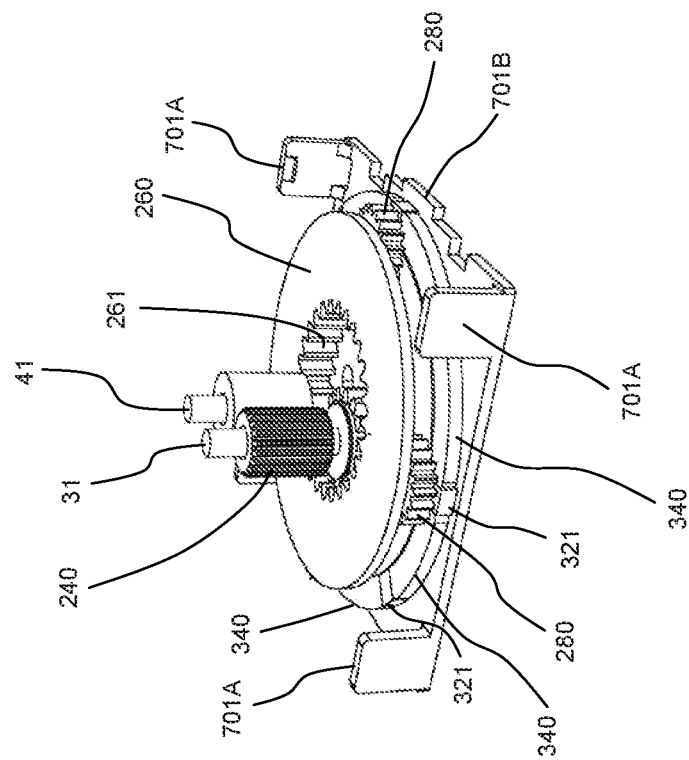
Fig. 8B REAR PERSPECTIVE VIEW
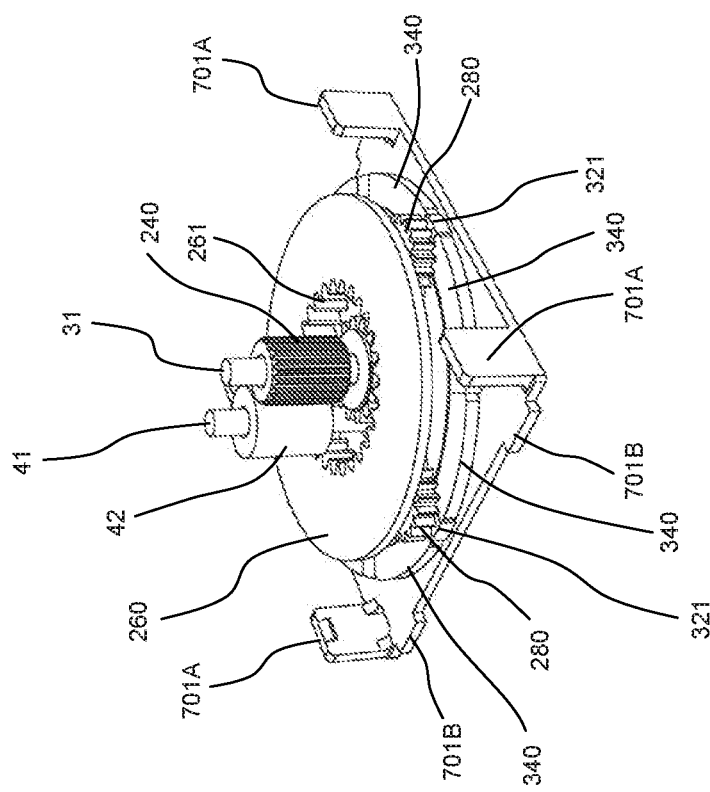
Fig. 8A FRONT PERSPECTIVE VIEW

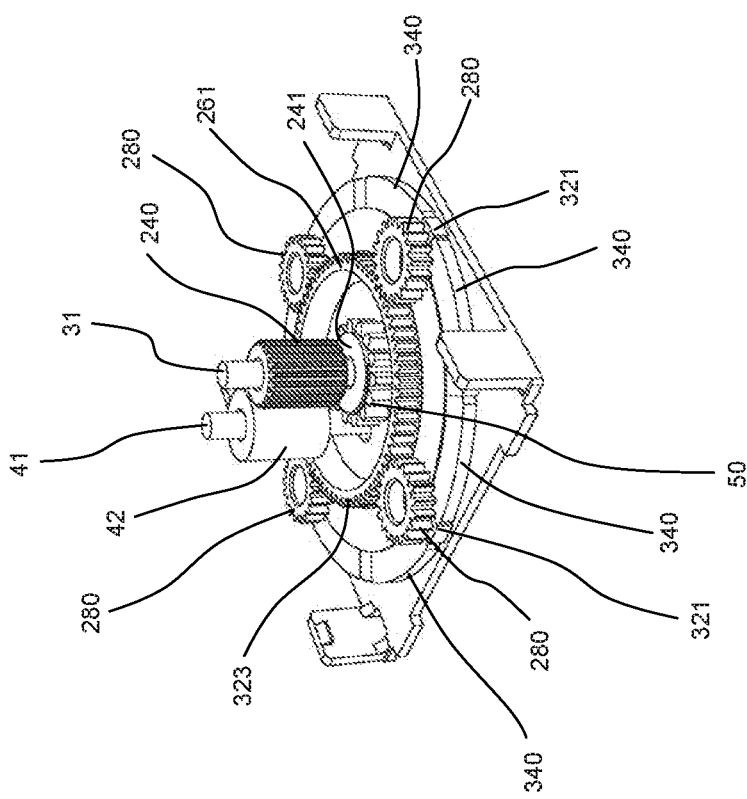
Fig. 9A FRONT PERSPECTIVE VIEW
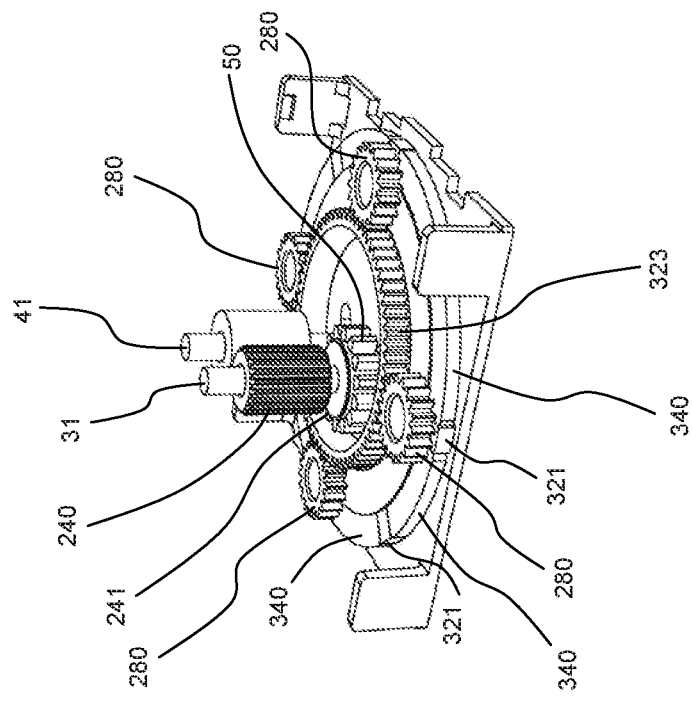
Fig. 9B REAR PERSPECTIVE VIEW

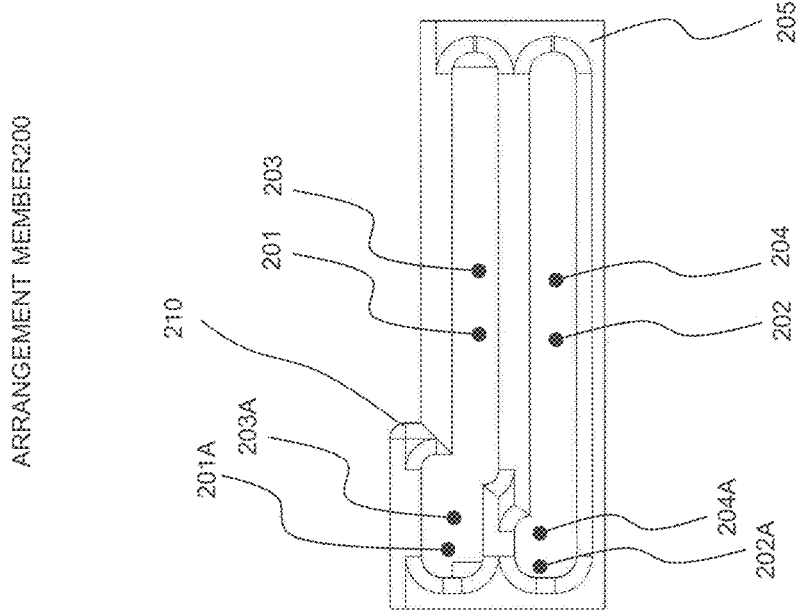
Fig. 11B FRONT VIEW
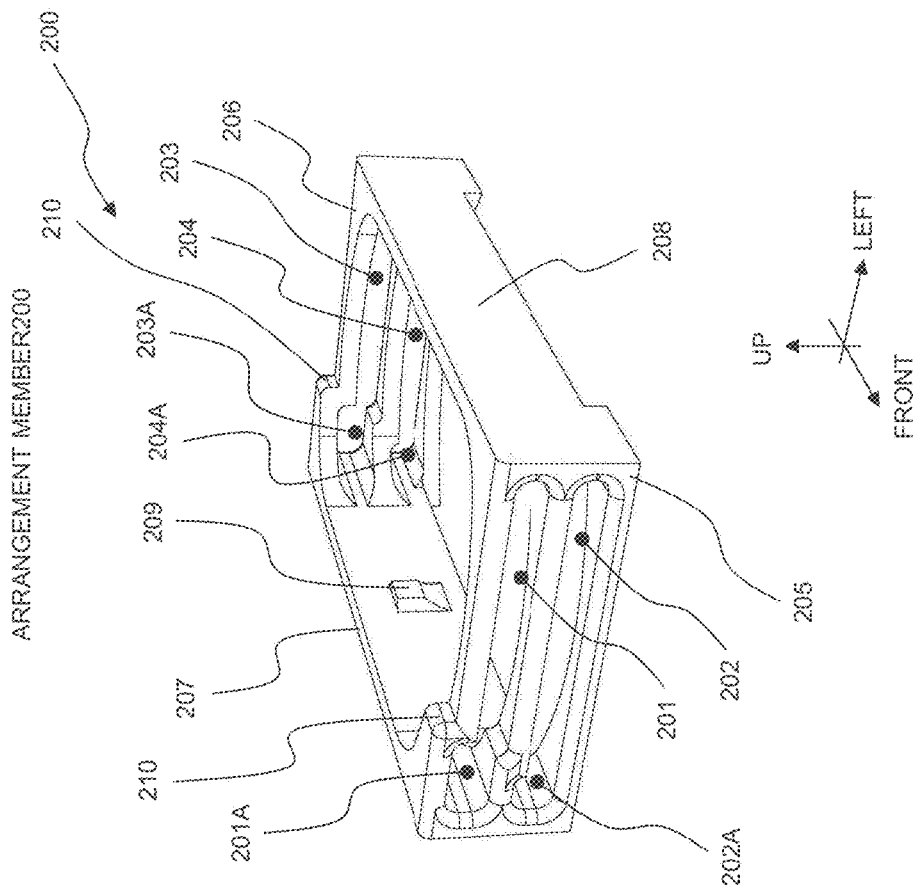
Fig. 11A PERSPECTIVE VIEW

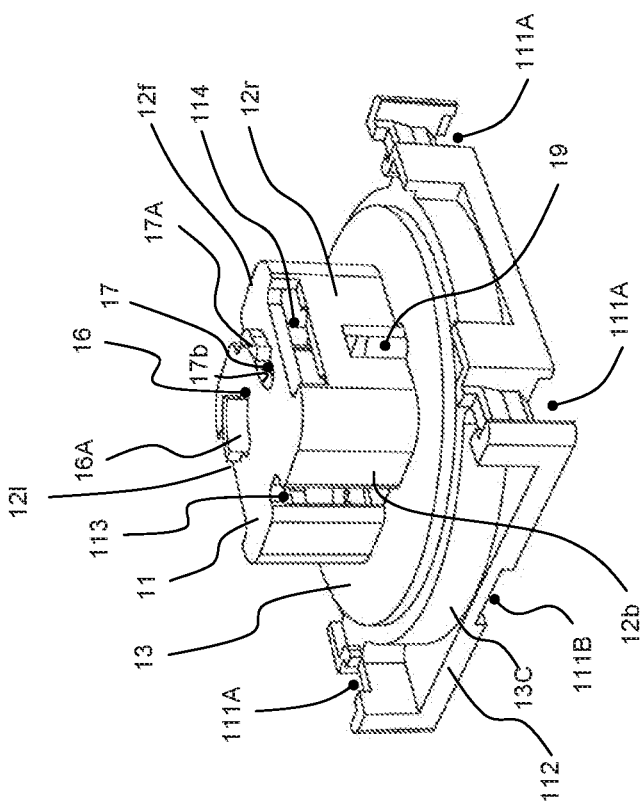
Fig. 12B REAR PERSPECTIVE VIEW
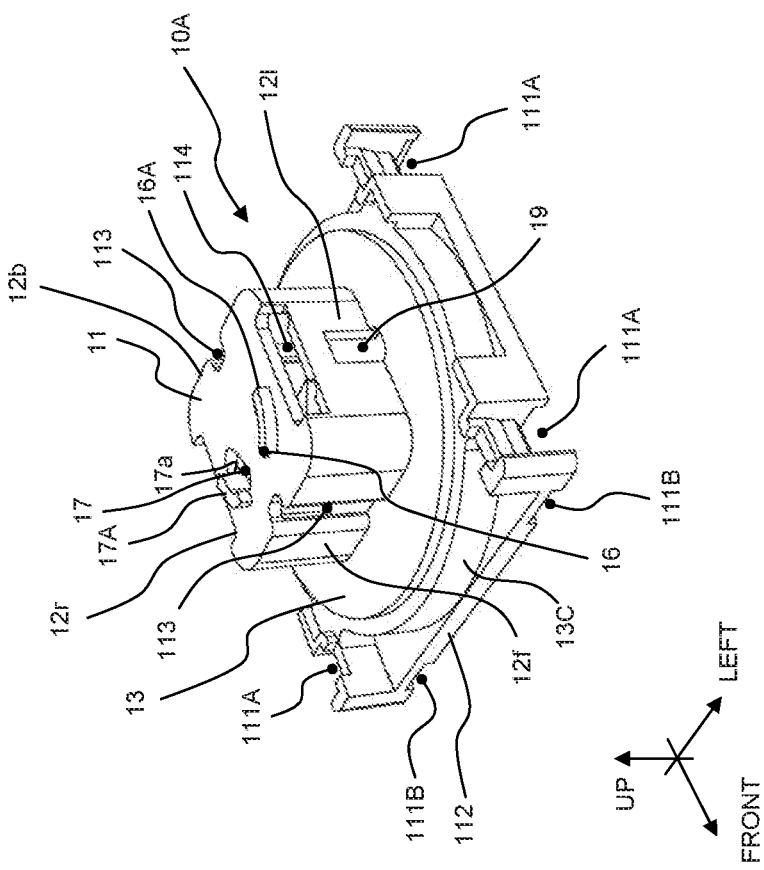
Fig. 12A FRONT PERSPECTIVE VIEW

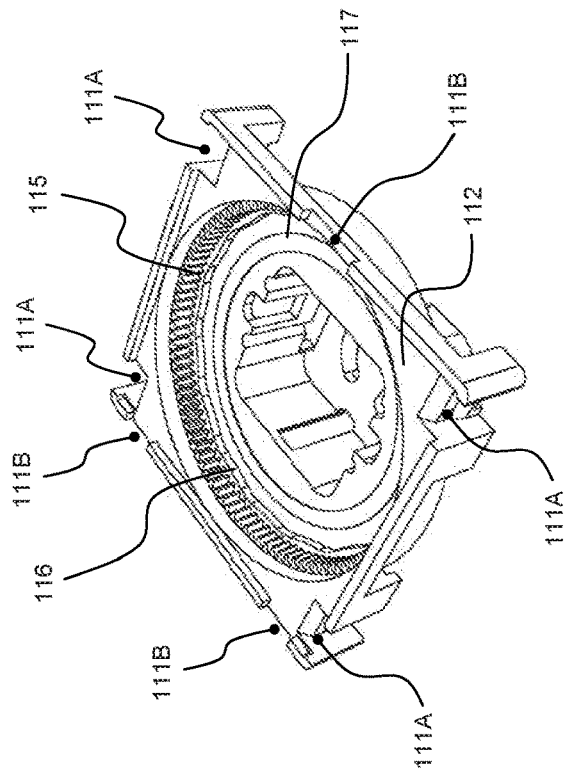
Fig. 13B PERSPECTIVE VIEW SEEN FROM BELOW
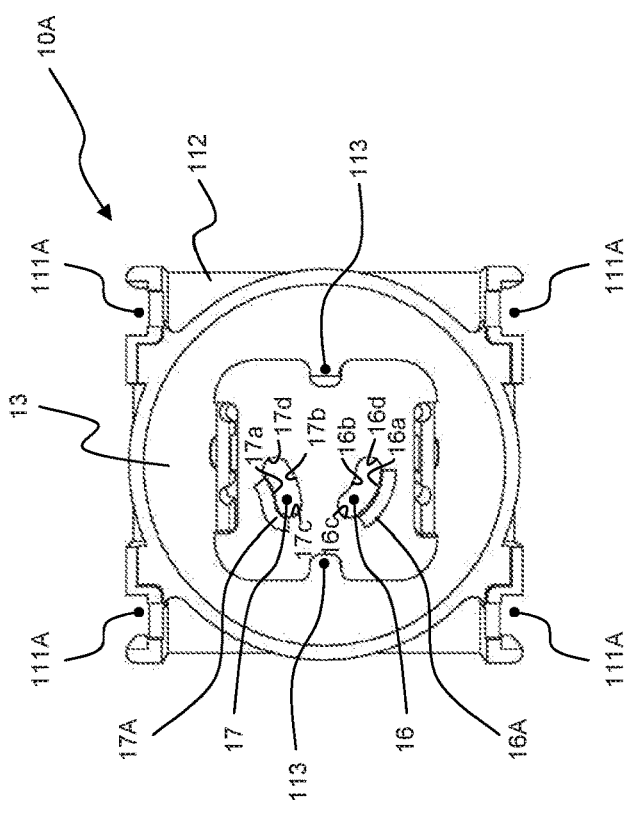
Fig. 13A PLAN VIEW

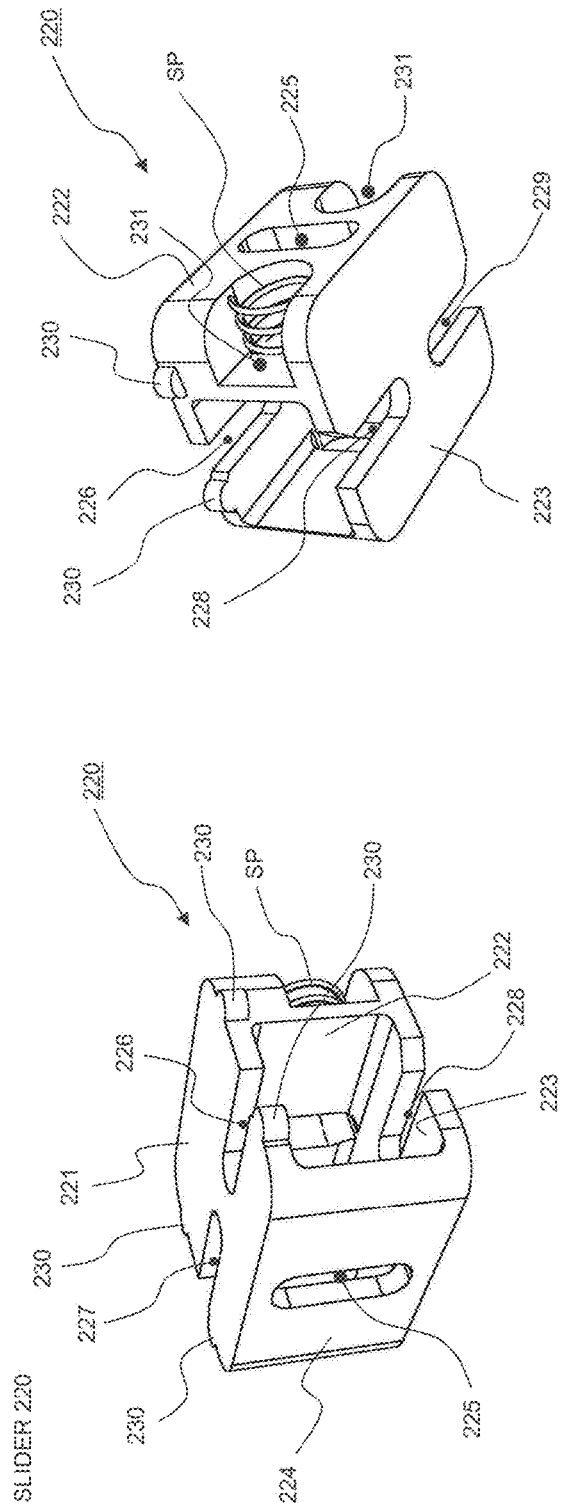
Fig. 14A FRONT PERSPECTIVE VIEW
Fig. 14B REAR PERSPECTIVE VIEW
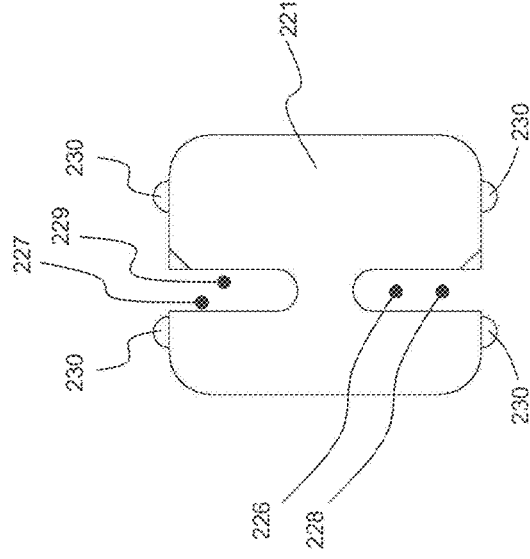
Fig. 14C PLAN VIEW

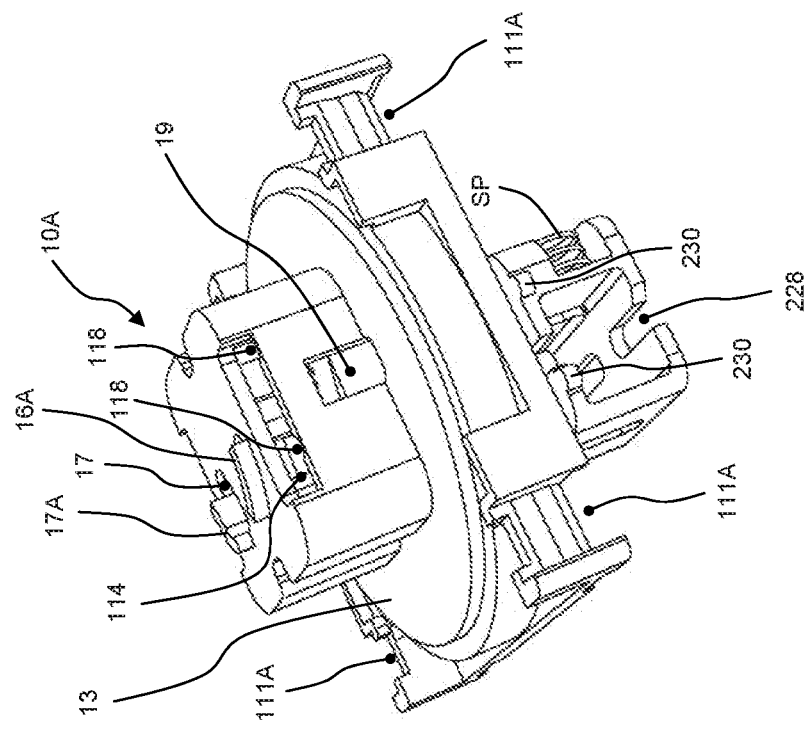
Fig. 15B PERSPECTIVE VIEW SEEN FROM ABOVE
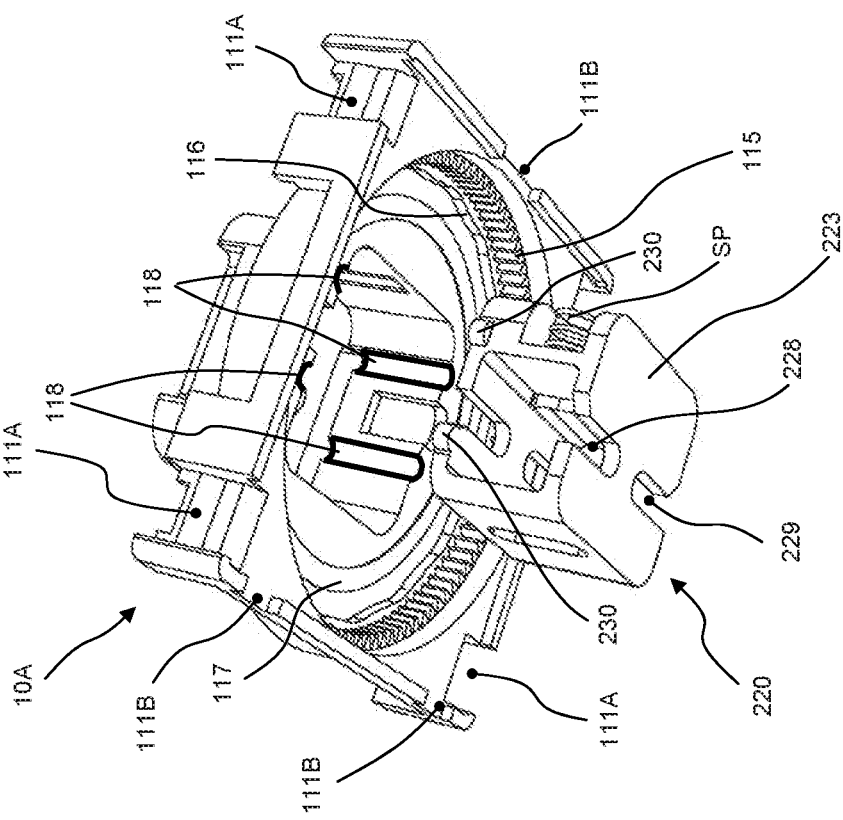
Fig. 15A PERSPECTIVE VIEW SEEN FROM BELOW

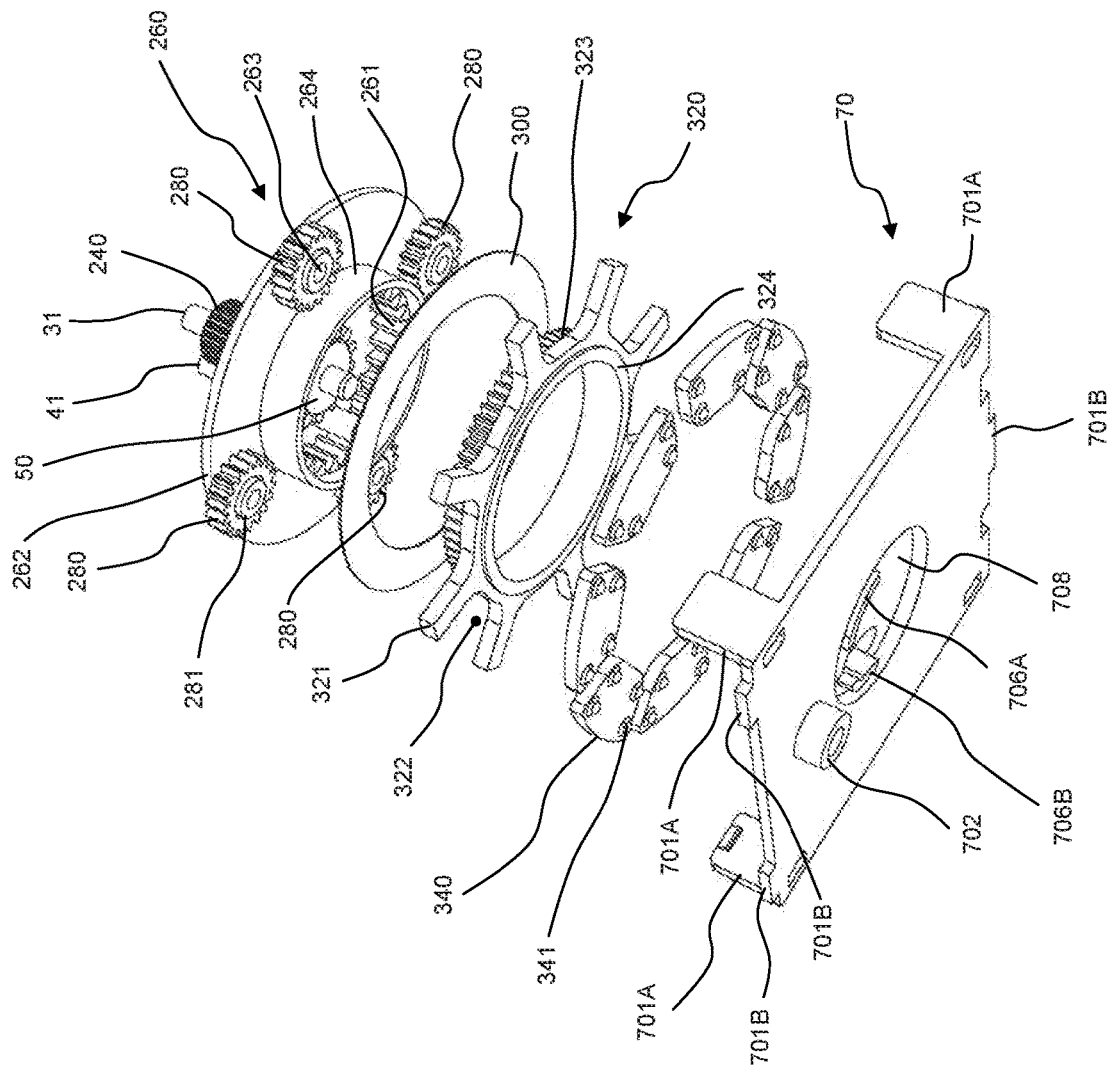
FIG. 16   MEMBERS OTHER THAN CASE 10A & SLIDER 220

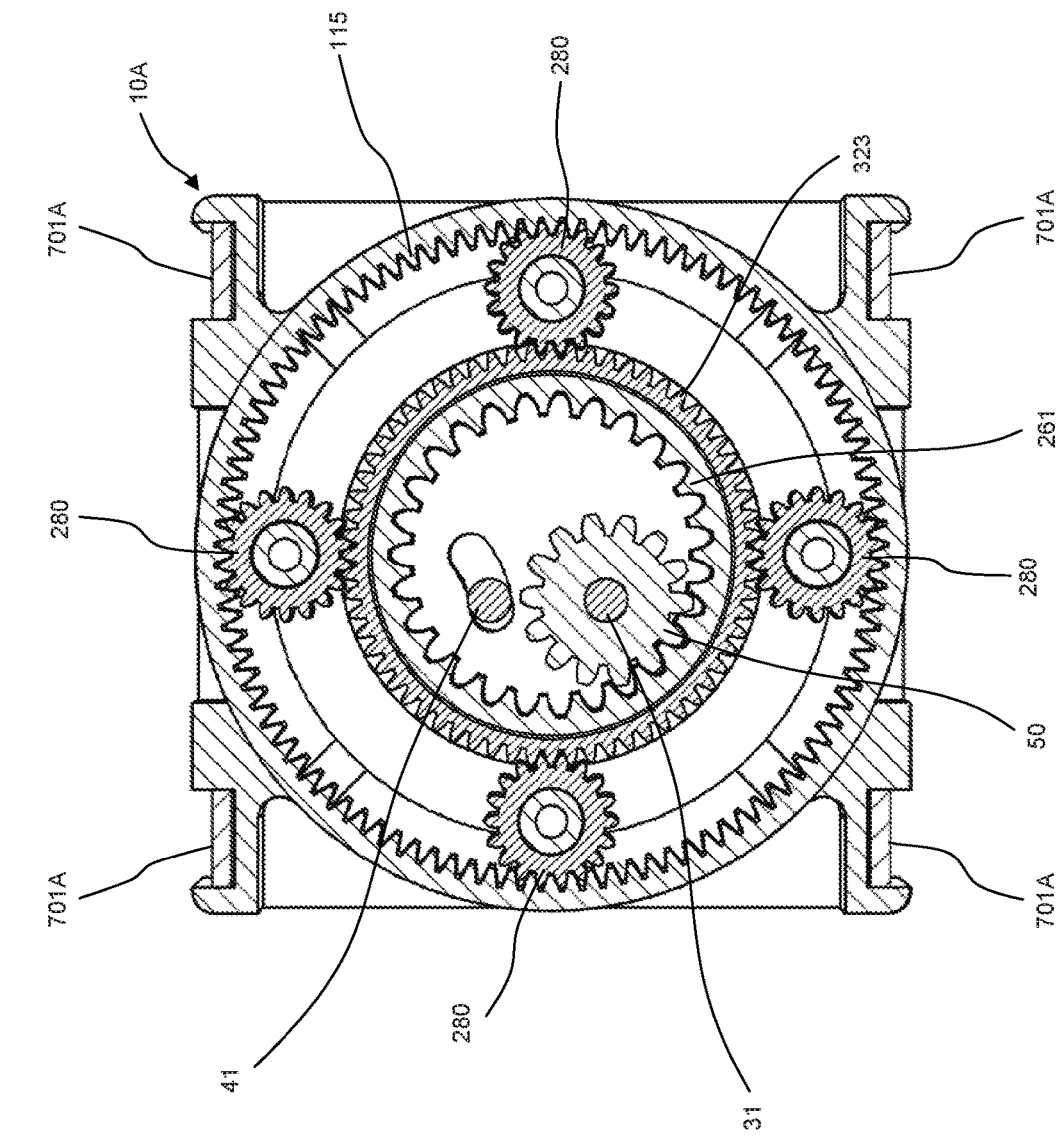
FIG. 17  LINE A-A SECTIONAL VIEW

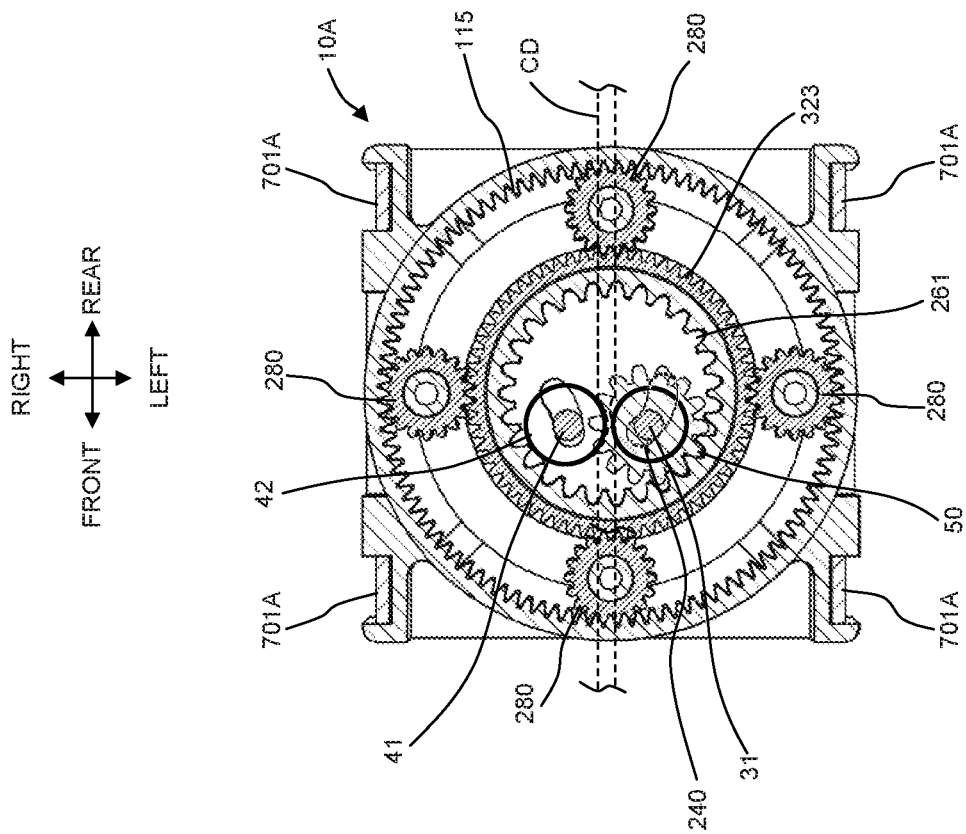
Fig. 19B SANDWICHED STATE
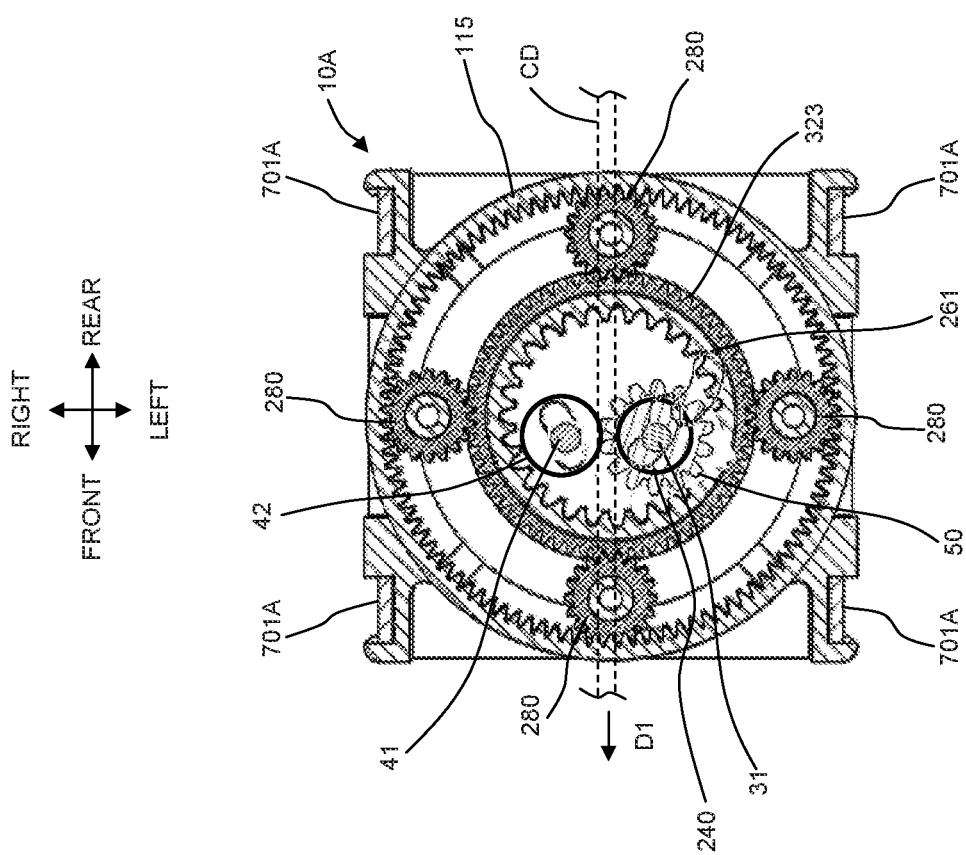
Fig. 19A STEADY STATE

Fig. 19C
ROTATION DIRECTIONS OF MEMBERS

| | Front-Rear | Left-Right | Rotation | Revolution |
|---|---|---|---|---|
| Pinion gear 50 | ↓ | ← | ↶ | ↶ |
| Internal gear 261 | - | - | ↷ | - |
| Planetary gear 280 | - | - | ↶ | ↷ |
| Sun gear 323 | - | - | ↶ | - |
| Inner gear 115 | - | - | - | - |

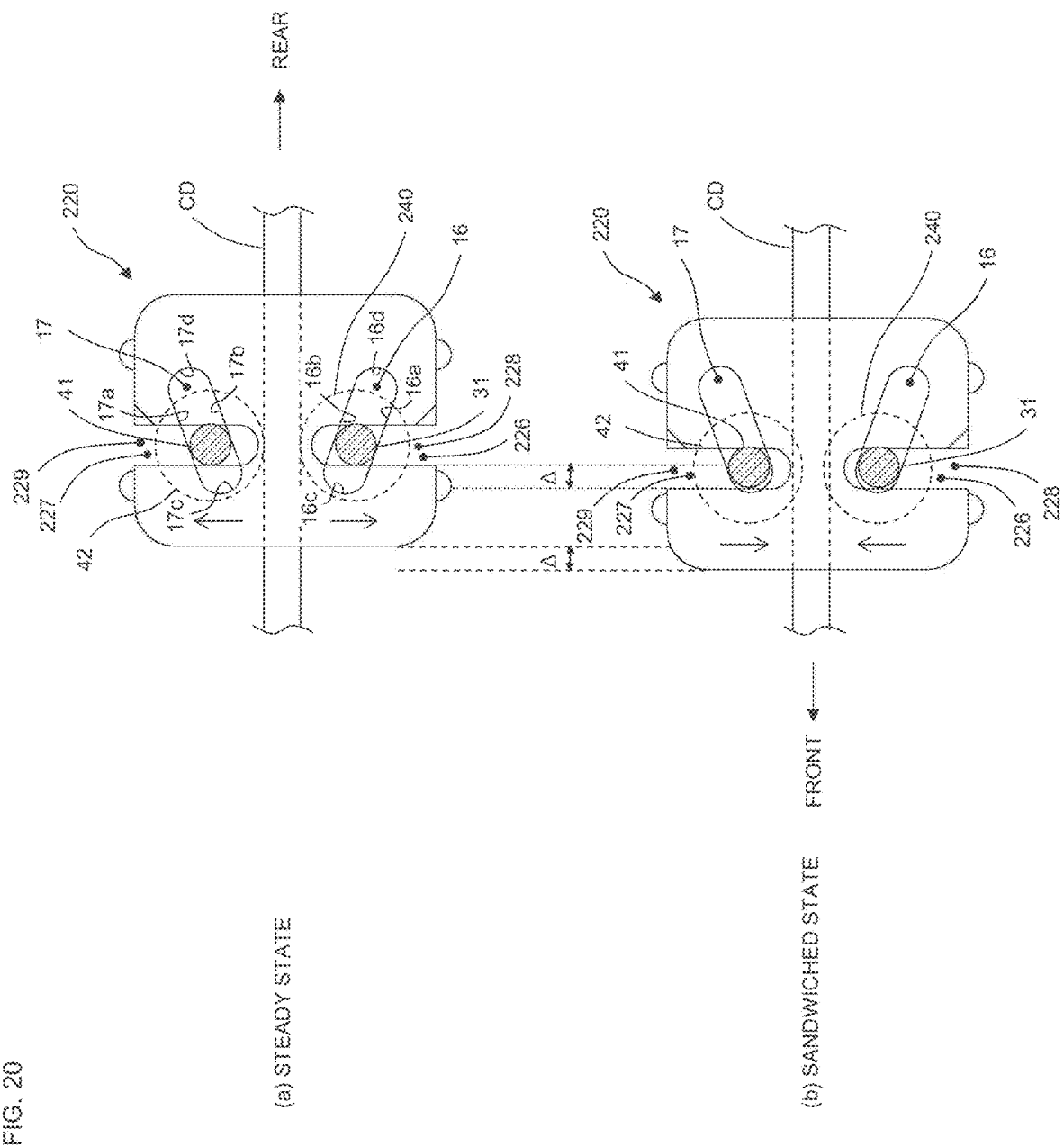

BRAKING DEVICE, AND SHIELDING DEVICE USING SAME

TECHNICAL FIELD

The present invention relates to a braking device and a shielding device using the same and, in particular, to a braking device and a shielding device using the same that are suitable for cases in which the movement of a cord can be slowed appropriately.

BACKGROUND ART

In addition to roller curtains and blinds, semiautomated, suspended/supported shielding devices such as accordion curtains, pleated screens, and partitions have been commercialized. For example, a horizontal blind is opened by pulling an operation cord and thus raising slats and a bottom rail serving as shielding members. On the other hand, the horizontal blind is closed by lowering the slats and bottom rail, typically using the gravity based on the self-weight of the slats and bottom rail. At this time, there is used a known mechanism that reduces the descent momentum of the slats and bottom rail by applying a braking force to a hoisting cord that moves in association with the descent of the slats and bottom rail.

Patent Literature 1 discloses a horizontal blind operation apparatus that deactivates a slat self-weight fall prevention device disposed in a head box so that slats can be lowered smoothly and at appropriate speed, in accordance with an operation of an operation rod for adjusting the slat angle.

CITATION LIST

Patent Literature

[Patent Literature 1] Japanese Unexamined Patent Application Publication No. Hei (1997)10-140950

SUMMARY OF THE INVENTION

Technical Problem

In the case of the apparatus disclosed in Patent Literature 1, even if the sandwiched cord is released, the cord remains bent. For this reason, the operation force required to pull hoisting cords may be increased, and the behavior of slats may be destabilized during an automatic fall.

Accordingly, an object of the present invention is to provide a braking device configured to release a cord in a non-bent state so that the operation force required to pull the cords is reduced and the behavior of slats is stabilized during an automatic fall, and a shielding device using the braking device.

Solution to Problem

The present invention provides a braking device for braking movement of a cord. The braking device includes a movement converter configured to convert movement of a cord into movement of another member. The movement converter comprises a sandwiching object configured to allow the cord to be sandwiched. The sandwiching object is configured to change a sandwiched state so that the cord is sandwiched by the sandwiching object when the cord and the sandwiching object move relatively in one direction and the cord is released in a non-bent state when the cord and the sandwiching object move relatively in another direction.

Various embodiments of the present invention are described below. Any of the embodiments described below can be combined with each other.

Preferably, the braking device further includes a resistance provider configured to, when the cord moves relatively in the one direction, generate resistance in association with movement of the cord.

Preferably, the sandwiching object includes a roller disposed in a position in which the roller can contact the cord and configured to be movable in a predetermined range and a sandwiching member disposed so that the cord is sandwiched between the sandwiching member and the roller. The roller is configured to move to a first position when the cord and the roller move relatively in one direction and to move to a second position when the cord and the roller move relatively in another direction.

Preferably, the roller is configured to be always kept in contact with the cord between the first position and the second position.

Preferably, the roller includes an energizer configured to energize the roller so that the roller moves in a direction in which the roller contacts the cord.

Preferably, the cord is sandwiched between the roller and the sandwiching member when the roller is located in the first position, and the cord is released in a non-bent state when the roller is located in the second position.

Preferably, the sandwiching member is a slope formed on a fixed member, and the roller moves along the slope so as to approach the cord.

Preferably, the roller is configured to move so that friction acting between the roller and the cord when the roller is located in the second position becomes smaller than friction acting between the roller and the cord when the roller is located in the first position.

Preferably, the braking device further includes a resistance provider configured to provide rotational resistance to the roller. Preferably, the roller is configured to be rotatable in accordance with movement of the cord in the one direction, and the roller continuously transmits rotation to the resistance provider even if the roller moves from the first position to the second position.

Preferably, the braking device further includes a resistance provider configured to, when the cord moves relatively in the one direction, generate resistance in association with movement of the cord. Preferably, when the roller is located in the first position, rotation of the roller caused by movement of the cord is outputted to the resistance provider, and when the roller is located in the second position, rotation of the roller caused by movement of the cord is not outputted to the resistance provider.

Preferably, the roller transmits rotation to the resistance provider directly or through a transmitter.

Preferably, the roller is configured to be movable in a movable direction including a vertical component with respect to a grounding surface of the braking device, when the roller is located in a first position which is a lower position in the movable direction, the cord is sandwiched between the roller and the sandwiching member, and when the roller is located in a second position which is an upper position in the movable direction, the cord is released in a non-bent state.

Preferably, the braking device further includes an auxiliary roller configured to move in conjunction with the roller. Preferably, when the roller is located in the first position, the cord is sandwiched between the roller, the sandwiching member, and the auxiliary roller.

Preferably, the braking device further includes an output member configured to rotate in the first position in association with rotation of the roller and a resistance provider configured to generate resistance in association with rotation of the output member.

Preferably, there is provided a shielding device including any one of the above braking devices and a sunlight shielding member suspended so as to be able to be raised and lowered in accordance with movement of the cord.

Preferably, there is provided a braking device for braking movement of a cord, wherein the braking device includes a movement converter configured to convert movement of a cord into movement of another member, the movement converter includes sandwiching object configured to allow the cord to be sandwiched, and the sandwiching object is configured to move along a moving direction of the cord so as to approach the cord.

Preferably, the sandwiching object is a pair of rollers, and the braking device further includes a holding member configured to hold the pair of rollers and having a pressing surface that moves the pair of rollers synchronously.

Advantageous Effects of the Invention

According to the braking device thus configured, the sandwiched cord can be released in a non-bent state. Thus, the bending resistance during the release of the cord can be reduced. As a result, the operation force required to pull the cords can be reduced, and the behavior of slats can be stabilized during an automatic fall.

BRIEF DESCRIPTION OF DRAWINGS

FIGS. 2A and 2B are exploded perspective views of a braking device 1000 of a second embodiment of the present invention, in which FIG. 2A is a drawing seen from a front-upper side; and FIG. 2B is a drawing seen from a rear-upper side.

FIGS. 3A and 3B are exploded perspective views of the braking device 1000 of the second embodiment of the present invention, in which FIG. 3A is a drawing seen from a front-lower side; and FIG. 3B is a drawing seen from a rear-lower side.

FIGS. 5A to 5C are assembly drawings of the braking device 1000 of the second embodiment of the present invention, in which FIG. 5A is a front perspective view; FIG. 5B is a rear perspective view; and FIG. 5C is a left side view.

FIGS. 6A and 6B are assembly drawings of the braking device 1000 of the second embodiment of the present invention, in which FIG. 6A is a plan view; and FIG. 6B is a bottom view.

FIGS. 7A and 7B are assembly drawings obtained by removing a case 10A from the braking device 1000 of the second embodiment of the present invention, in which FIG. 7A is a front perspective view; and FIG. 7B is a rear perspective view.

FIGS. 8A and 8B are assembly drawings obtained by further removing a slider 220 from FIG. 16, in which FIG. 8A is a front perspective view; and FIG. 8B is a rear perspective view.

FIGS. 9A and 9B are assembly drawings obtained by further removing an internal gear-provided carrier 260 from FIGS. 8A and 8B, in which FIG. 9A is a front perspective view; and FIG. 9B is a rear perspective view.

FIGS. 11A and 11B are drawings showing an arrangement member 200 of the second embodiment of the present invention, in which FIG. 11A is a perspective view; and FIG. 11B is a front view.

FIGS. 12A and 12B are drawings showing the case 10A of the second embodiment of the present invention, in which FIG. 12A is a front perspective view; and FIG. 12B is a rear perspective view.

FIGS. 13A and 13B are drawings showing the case 10A of the second embodiment of the present invention, in which FIG. 13A is a plan view; and FIG. 13B is a perspective view seen from below.

FIGS. 14A to 14C are drawings showing the slider 220 of the second embodiment of the present invention, in which FIG. 14A is a front perspective view; FIG. 14B is a rear perspective view seen from below; and FIG. 14C is a plan view.

FIGS. 15A and 15B are drawings showing the case 10A and slider 220 of the second embodiment of the present invention, in which FIG. 15A is a perspective view seen from below; and FIG. 15B is a perspective view seen from above.

FIG. 16 is an exploded perspective view showing members other than the case 10A and slider 220 of the second embodiment of the present invention.

FIG. 17 is a sectional view taken along line A-A in FIG. 5C.

FIGS. 19A to 19C are drawings showing an aspect in which the braking device 1000 of the present invention brakes cords CD using FIG. 17, in which FIG. 19A is a drawing showing a state in which no tension is being applied to the cords CD (steady state); FIG. 19B is a drawing showing a state in which tension is being applied to the cords CD and the cords CD are sandwiched between the knurled roller 240 and roller 42 (sandwiched state); and FIG. 19C is a table showing the rotation directions of the members when the state in FIG. 19A is changed to the state in FIG. 19B.

FIG. 20 is are drawings showing the aspect of the movement of the slider 220 corresponding to 19A to 19C.

DESCRIPTION OF EMBODIMENTS

Figure 1:
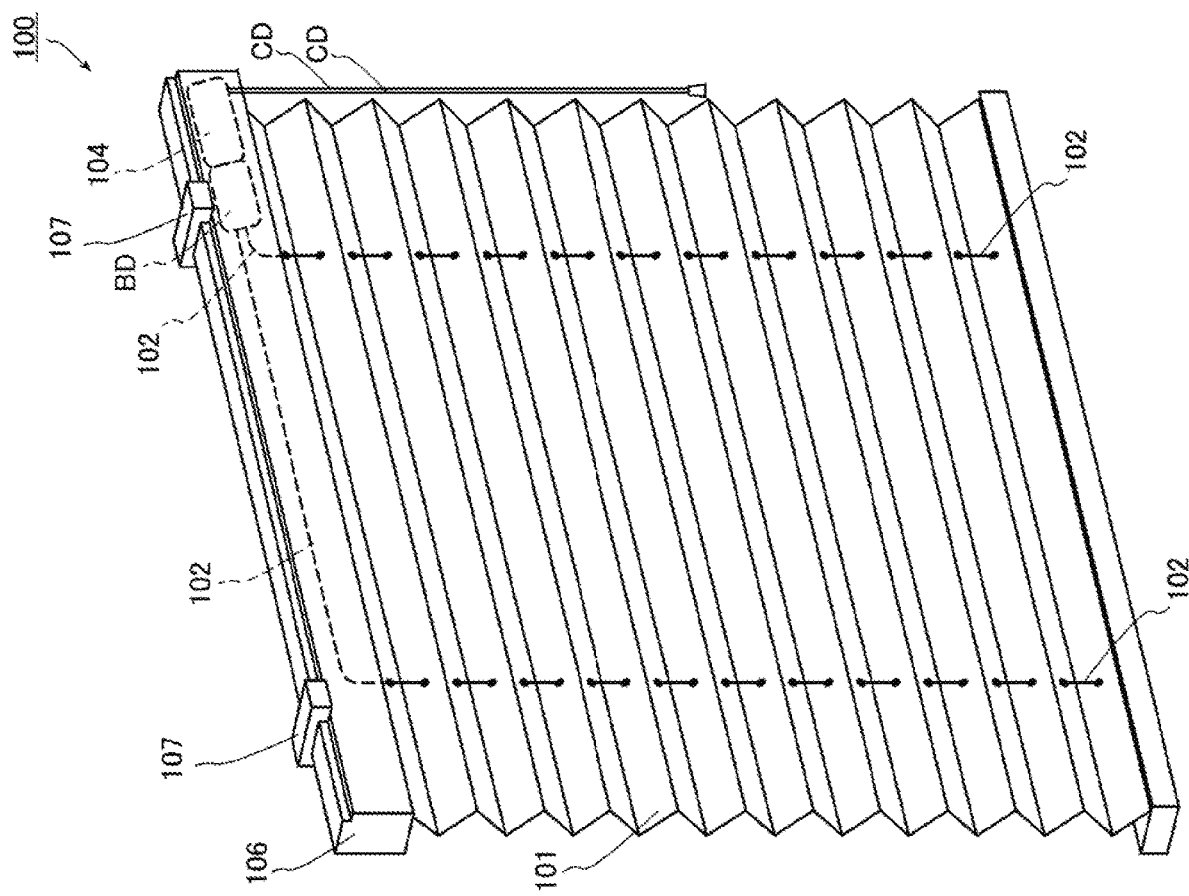
FIG. 1 is a view showing a solar radiation shielding device according to a first embodiment.

Now, preferred embodiments of a braking device of the present invention and a sunlight shielding device using the braking device will be described in detail with reference to the drawings.

2. Second Embodiment

Next, referring to FIGS. 1 to 20, a braking device 1000 of a second embodiment of the present invention will be described. While the braking device 1000 of the second embodiment is a braking device that brakes the movement of a cord, as with the brake BD of the first embodiment, there is a difference in configuration therebetween. Specifically, the difference is as follows: in the brake BD of the first embodiment, the movement converter DT and resistance provider RA are disposed on an approximately horizontal plane; in the braking device 1000 of the second embodiment, a mechanism corresponding to the movement converter DT and a mechanism corresponding to the resistance provider RA are disposed approximately vertically. In the second embodiment, a slider 220, a coil spring SP, an idle roller 40 including a shaft 41 and a roller 42, a knurled roller 240, a pinion gear 50, a shaft 31, a washer 241, an internal gear-provided carrier 260 correspond to the movement converter DT, and weights 340, a sun gear-provided weight holder 320 and a case 10A correspond to the resistance provider RA. Hereafter, the difference between the first and second embodiments will be mainly described. In the description, the same members as those in the first embodiment are given the same reference signs.

2-1 Overall Configuration

FIGS. 2A to 3B are exploded perspective views of the braking device 1000 of the second embodiment. The braking device 1000 includes an arrangement member 200, the case 10A, the slider 220, the coil spring SP, the idle roller 40 including the shaft 41 and roller 42, the knurled roller 240, the pinion gear 50, a shaft 31 passed through the knurled roller 240 and pinion gear 50, the washer 241, the internal gear-provided carrier 260, planetary gears 280, a plate 300, the sun gear-provided weight holder 320, the weights 340, and a base 70.

In the second embodiment, the idle roller 40 and knurled roller 240 correspond to sandwiching object by which cords are sandwiched. Also, the idle roller 40 corresponds to the sandwiching member the column, and the knurled roller 240 corresponds to the roller that rotates due to the movement of the cords in the length direction. The slider 220 corresponds to the slider 20 of the first embodiment.

As shown in FIGS. 2A to 3B, in the second embodiment, the internal gear-provided carrier 260 is provided with four planetary gears 280, and eight weights 340 are held by the sun gear-provided weight holder 320. The respective members will be described below.

2-1-1 Arrangement Member 200

As shown in FIGS. 5A and 5B, the arrangement member 200 has the cords CD passed therethrough and arranges the cords CD in the same direction. The arrangement member 200 can be formed of, for example, a resin. As shown in FIG. 5A, the directions of arrows are defined as the front-rear direction, left-right direction, and up-down direction. Specifically, the direction in which the distance between a first top wall groove 16 and a second top wall groove 17 is reduced is defined as the front direction, and then the left-right direction (width direction) and the up-down direction are defined.

As shown in FIG. 11A, the arrangement member 200 includes a front wall 205, a right wall 207 and a left wall 208 connected to the front wall 205, and a rear wall 206 connected to the right wall 207 and left wall 208. The front wall 205, right wall 207, left wall 208, and rear wall 206 may have any shape and, in the second embodiment, are approximately rectangular. Also, in the second embodiment, the front wall 205 and rear wall 206 have approximately symmetrical shapes.

The front wall 205 has a first front groove 201, a first front cord insertion part 201A, a second front groove 202, and a second front cord insertion part 202A. The rear wall 206 has a first rear groove 203, a first rear cord insertion part 203A, a second rear groove 204, and a second rear cord insertion part 204A.

The first front cord insertion part 201A and second front cord insertion part 202A are parts through which the cords CD are inserted into the arrangement member 200 after assembling the braking device 1000. The first front cord insertion part 201A is formed so as to be wider than the first front groove 201. The second front cord insertion part 202A is formed so as to be wider than the second front groove 202. The cords CD can be inserted smoothly by first inserting the cords CD into the first front cord insertion part 201A and second front cord insertion part 202A and then sliding the cords CD toward the first front groove 201 and second front groove 202.

The first rear cord insertion part 203A and second rear cord insertion part 204A are parts of the rear wall 206 through which the cords CD inserted into the front wall 205 and passed through front and rear through holes 225 (see FIG. 23) of the slider 220 (to be discussed later) are drawn out of the arrangement member 200. The first rear cord insertion part 203A is formed so as to be wider than the first rear groove 203. The second rear cord insertion part 204A is formed so as to be wider than the second rear groove 204. The cords CD can be inserted smoothly by first inserting the cords CD into the first rear cord insertion part 203A and second rear cord insertion part 204A and then sliding the cords CD toward the first rear groove 203 and second rear groove 204.

The first front cord insertion part 201A, second front cord insertion part 202A, first rear cord insertion part 203A, and second rear cord insertion part 204A need not have shapes shown in FIG. 20 and may have any shape. For example, the first cord insertion part 201A may have an approximately circular shape, or may be shaped so that it is longitudinally long, then oblique, and then connected to the first front groove 201 from left to right (this also applies to the other grooves). Also, in the second embodiment, a step 210 is provided between the first front cord insertion part 201A and first front groove 201. However, the front wall 205 may be approximately rectangular without having the step 210 (this also applies to the rear wall 206).

As shown in FIG. 11B, in the second embodiment, the front wall 205 and rear wall 206 have approximately the same shape in front view. Accordingly, the cord CD inserted through the first front cord insertion part 201A is drawn out through the first rear cord insertion part 203A, and the cord CD inserted through the second front cord insertion part 202A is drawn out through the second rear cord insertion part 204A. In other words, the first front groove 201 and first front cord insertion part 201A and the first rear groove 203 and first rear cord insertion part 203A are a pair of corresponding grooves; the second front groove 202 and second front cord insertion part 202A and the second rear groove 204 and second rear cord insertion part 204A are a pair of corresponding grooves.

As shown in FIG. 11A, the right wall 207 of the arrangement member 200 is provided with a nail 209. The nail 209 becomes engaged with an engaging hole 19 (see FIG. 21) of the case 10A (to be discussed later) and fixes the arrangement member 200 to the case 10A when mounting the arrangement member 200 on the case 10A so as to cover the case 10A from above during the assembly of the braking device 1000. Although not shown in FIG. 11A, the inner surface of the left wall 208 is also provided with a similar nail 209 which is disposed so as to be opposed to the nail 209. The arrangement member 200 can be mounted on the case 10A by elastically engaging the two nails 209 of the arrangement member 200 with the two left and right engaging holes 19 of the case 10A while elastically deforming the right wall 207 and left wall 208 outward.

2-1-2 Case 10A

Next, the case 10A will be described with reference to FIGS. 12A, 12B, and 22. Note that in FIG. 22, the left direction is referred to as the front; the right direction as the rear; the up direction as the right; and the down direction as the left. The case 10A forms a cabinet with the base 70 and holds within itself the slider 220, the coil spring SP, the idle roller 40 including the shaft 41 and roller 42, the knurled roller 240, the pinion gear 50, the shaft 31, the washer 241, the internal gear-provided carrier 260, the planetary gears 280, the plate 300, the sun gear-provided weight holder 320, and the weights 340.

The case 10A forms the cabinet of the braking device 1000 with the base 70, for example, as shown in FIG. 16. The case 10A also forms a resistance provider RA with the sun gear-provided weight holder 320 and weights 340, for example, shown in FIG. 16.

As shown in FIGS. 12A and 12B, the case 10A mainly includes a top wall 11 having an approximately square outer shape, a front side wall 12f, a right side wall 12r and a left side wall 12l connected to the front side wall 12f and top wall 11, a rear side wall 3B connected to the right side wall 12r and left side wall 12l, a collar 13 opposed to the top wall 11 and extending radially from the right side wall 12r, rear side wall 3B, front side wall 12f and left side wall 12l, a barrel 13C connected to the collar 13, and a cover 112 connected to the barrel 13C.

The front side wall 12f and rear side wall 3B have guide grooves 113. The two guide grooves 113 are opposed to each other in the front-rear direction. The guide grooves 113 are grooves through which the cords CD are inserted into the case 10A in the front-rear direction. Any number of cords CD may be inserted through the guide grooves 113. In the second embodiment, three cords CD are inserted longitudinally (see FIG. 14).

The right side wall 12r and left side wall 12l have the engaging holes 19. As described above, the engaging holes 19 are engaged with the nails 209 of the arrangement member 200 to fix the arrangement member 200 to the case 10A.

Provided above the left and right engaging holes 19 are support grooves 114. As shown in FIG. 14, the support grooves 114 support protrusions 230 of the slider 220 when the case 10A holds the slider 220 within itself. Thus, the slider 220 can be supported so as to be floating. Details will be described later.

The top wall 11 has a first top wall groove 16 and a second top wall groove 17. As shown in FIG. 13A, the first top wall groove 16 and second top wall groove 17 are formed so as to be inclined with respect to the length direction of the cords CD, that is, the front-rear direction. The distance between the first top wall groove 16 and second top wall groove 17 is reduced in the front direction, which is one length direction of the cords CD. The first top wall groove 16 has an arc shape, and the arc shape of the first top wall groove is formed so as to be concentric with the inner circumferential surface of the internal gear-provided carrier 260 shown in FIG. 17 in plan view. On the other hand, the second top wall groove 17 has a gently curved shape. Specifically, a front portion of the second top wall groove 17 is approximately linear, and more rear portions thereof are bent in the direction in which the second top wall groove 17 departs from the first top wall groove 16. The reason is as follows: the first top wall groove 16 has an arc shape such that it approaches the cords CD from the rear toward the front; accordingly, if the second top wall groove 17 is approximately linear, the shaft 31 and shaft 41 would be vertically displaced from the cords CD to different degrees when the shaft 31 and shaft 41 move along the first top wall groove 16 and second top wall groove 17, respectively; and the above shape of the second top wall groove 17 prevents such displacement. That is, if one groove is arc-shaped and the other is approximately linear, the vertical distance to the cords CD in the front-rear direction would vary between the shaft 31 and shaft 41. By causing the shafts 31, 41 to be vertically displaced from the cords CD to similar degree in this manner, the cords CD can be appropriately sandwiched between the knurled roller 240 and roller 42. Note that the second top wall groove 17 is not limited to this shape and may be, for example, a groove that has approximately the same shape as the first top wall groove 16 and is bent toward the cords CD. Thus, the shafts 31, 41 can be caused to be vertically displaced from the cords CD to approximately the same degree and thus the wear in the cords CD can be reduced. While, in the second embodiment, the shape shown in FIG. 13A is employed in order to cause the shafts 31, 41 to be vertically displaced from the cords CD to the same degree as much as possible, interactions or the like due to the movement or the like of other members are also considered in employing this shape.

As shown in FIGS. 12A, 12B, and 13A, a first guide wall 7A protruding upward from the first top wall groove 16 is disposed on at least part of a position along the outer edge of the case 10A, of the first top wall groove 16 in plan view. In the second embodiment, the first guide wall 7A is disposed so as to form an angle of approximately 90° with the first top wall groove 16. The first guide wall 7A aims to reduce the surface pressure of the shaft 31 that moves along the first top wall groove 16. Specifically, by disposing the first guide wall 7A, the area that contacts the shaft 31 is increased and thus the surface pressure of the shaft 31 is reduced. More specifically, while tension is applied to the cords CD and the braking device 1000 is in operation, the surface pressure of the shaft 31 is being applied to the inner surface of the first top wall groove 16; if the inner surface of the first top wall groove 16 is shaved due to this surface pressure, the distance between the knurled roller 240 and roller 42 may vary and thus rotation may not be sufficiently transmitted to the knurled roller 240; and the disposition of the first guide wall 7A can prevent the case 10A from being shaved due to the pressure from the shaft 31. The thickness of the first guide wall 7A may be any thickness and is preferably appropriately designed considering the material of the case 10A, the moving speed of the shaft 31, or the like.

A second guide wall 8A protruding upward from the second top wall groove 17 is disposed on at least part of a position along an edge distant from the center of the case 10A in a position along the outer edge of the case 10A, of the second top wall groove 17 in plan view. In the second embodiment, the second guide wall 8A is disposed so as to form an angle of approximately 90° with the second top wall groove 17. The second guide wall 8A aims to reduce the surface pressure of the shaft 41 that moves along the second top wall groove 17. Specifically, by disposing the second guide wall 8A, the area that contacts the shaft 41 is increased and thus the surface pressure of the shaft 41 is reduced. More specifically, while tension is applied to the cords CD and the braking device 1000 is in operation, the surface pressure of the shaft 41 is being applied to the inner surface of the second top wall groove 17; if the inner surface of the second top wall groove 17 is shaved due to this surface pressure, the distance between the knurled roller 240 and roller 42 may vary and thus rotation may not be sufficiently transmitted to the knurled roller 240; and the disposition of the second guide wall 8A can prevent the case 10A from being shaved due to the pressure from the shaft 41. The thickness of the second guide wall 8A may be any thickness and is preferably appropriately designed considering the material of the case 10A, the moving speed of the shaft 41, or the like.

Note that if the case 10A is formed of a strong material such as a metal, the first guide wall 7A or second guide wall 8A need not be disposed. This is because the case 10A is robust and therefore is hardly shaved due to the pressure from the shaft 31 and shaft 41.

The collar 13 is a member that is opposed to the top wall 11 and extends radially from the right side wall 12r, rear side wall 3B, front side wall 12f, and left side wall 12l. In the second embodiment, the collar 13 is approximately circular.

The barrel 13C is connected to the collar 13 and located outside an inner circumferential gear 115. In the second embodiment, the barrel 13C is approximately cylindrical.

The cover 112 is a member that is connected to the barrel 13C and fitted into the base 70. In the second embodiment, the outer edge of the cover 112 is approximately square. The cover 112 has two first engaging grooves 111A in both edges of each of the left and right side surfaces thereof. The cover 112 also has two second engaging grooves 111B in both ends of the front edge thereof and has one second engaging groove 111B approximately in the center of the rear edge. The first engaging grooves 111A are engaged with first engaging plates 701A of the base 70 shown in FIGS. 7A and 7B. The second engaging groove 111B is engaged with second engaging plates 701B of the base 70. Thus, the case 10A and base 70 are engaged with each other, forming the cabinet.

Next, the internal structure of the case 10A will be described with reference to FIGS. 13B, 15A, and 15B. As shown in FIG. 17, the ring-shaped inner circumferential gear 115 engaged with the planetary gears 280 is formed in the case 10A. Formed above the inner circumferential gear 115 is a waveform part 116 that is approximately ring-shaped in plan view. In the waveform part 116, horizontally less distant portions and horizontally distant portions from the center of a circle passing through the center of the inner circumferential gear 115 are arranged alternately and form a zigzag shape in plan view. Specifically, the waveform part 116 is in the shape of a polygon obtained by connecting many straight lines. The inner surface of the collar 13 is provided with a step 117. The disposition of the waveform part 116 and step 117 can facilitate the positioning of other members, such as the internal gear-provided carrier 260, and reduce the friction resistance.

As shown in FIGS. 15A and 15B, the left and right inner surfaces of the case 10A have four grooves 118. The grooves 118 are grooves through which the protrusions 230 of the slider 220 (to be discussed later) are passed during the assembly or disassembly of the braking device 1000. In the second embodiment, the slider 220 has four protrusions 230 and therefore the case 10A also has four grooves 118.

2-1-3 Slider 220

Next, referring to FIG. 23, the slider 220 will be described. The slider 220 serves as a movement member that holds the idle roller 40 and knurled roller 240 within itself and moves together with the idle roller 40 and knurled roller 240. The slider 220 includes a top wall 221, a rear side wall 222 and a front side wall 224 connected to the top wall 221, and a bottom wall 223 connected to the rear side wall 222 and front side wall 224.

The top wall 221 is approximately rectangular and has a first top wall groove 226 and a second top wall groove 227 forming a pair. The first top wall groove 226 and second top wall groove 227 are linear grooves extending along the left-right direction and aligned with each other.

The bottom wall 223 is opposed to the top wall 221. In the second embodiment, the bottom wall 223 has approximately the same shape as the top wall 221, but the top wall 221 and bottom wall 223 may have different shapes. The bottom wall 223 also have a first bottom wall groove 228 and a second bottom wall groove 229 that are aligned with each other in the left-right direction and form a pair. The first bottom wall groove 228 is opposed to the first top wall groove 226 in the up-down direction, and the second bottom wall groove 229 is opposed to the second top wall groove 227 in the up-down direction. Accordingly, as shown in FIG. 14C, the top and bottom grooves of the slider 220 appear to overlap each other in plan view.

The widths of the first top wall groove 226 and first bottom wall groove 228 are sizes within which the diameter of the shaft 31 falls. The widths of the second top wall groove 227 and second bottom wall groove 229 are sizes within which the diameter of the shaft 41 falls.

The four corners of the top wall 221 are provided with the protrusions 230 protruding in the left-right direction. As shown in FIGS. 5A to 5C, the protrusions 230 are fitted in support grooves 114 of the case 10A and support the slider 220 in the case 10A in a floating state. In other words, the slider 220 is held so as to be in non-contact with the internal gear-provided carrier 260 located below.

The front side wall 224 and rear side wall 222 have through holes 225. The through holes 225 penetrate through the front side wall 224 and rear side wall 222 in approximate width-direction centers of the front side wall 224 and rear side wall 222 in the front-rear direction. The holes may have any shape, but must have shapes into which at least one cord CD can be inserted. Preferably, the holes have shapes into which longitudinally arranged multiple cords CD can be inserted. In the second embodiment, the holes have approximately oval shapes that are long in the up-down direction.

As shown in FIG. 14B, the rear side wall 222 has, on both sides of the through holes 225, recesses 231 formed from the outer side surfaces of the rear side wall 222. The recesses 231 may have any shapes and, for example, may have shapes obtained by notching the rear side wall 222 from the through hole 225 to the side surfaces, as shown in FIG. 14B, or the recesses 231 may be approximately circular or rectangular recesses or the like. In the second embodiment, the coil spring SP is disposed in the left recess 231, and one end of the coil spring SP protrudes from the recess 231. During the assembly of the braking device 1000, the coil spring SP contacts the inner wall of the case 10A and energizes the slider 220 in the front direction. Note that the portion protruding from the recess 231, of the coil spring SP is not shown in FIG. 14B. The coil spring SP may be disposed in the right recess 231, or coil springs SP may be disposed in the left and right recesses 231.

The size in the left-right direction, of the slider 220 thus shaped is approximately the same as the distance between the inner walls in the width direction, of the case 10A. The size in the front-rear direction, of the slider 220 is smaller than the distance between the inner walls in the front-rear direction, of the case 10A. Accordingly, when the slider 220 is disposed in the space of the case 10A, the side surfaces of the top wall 221 and bottom wall 223 of the slider 220 contact the inner walls in the width direction, of the case 10A, and the movement in the width direction, of the slider 220 is regulated by the case 10A. In this state, the guide grooves 113 of the case 10A and the through holes 225 of the slider 220 are arranged in the front-rear direction. That is, the through holes 225 are holes for inserting the cords CD into the slider 220. On the other hand, in a state in which the slider 220 is disposed in the space of the case 10A, there are gaps in the front-rear direction between the slider 220 and the inner walls of the case 10A. Thus, the slider 220 can move in the front-rear direction with respect to the case 10A. Also, in a state in which the slider 220 is disposed in the space of the case 10A, the coil spring SP protruding from the recess 231 of the rear side wall 222 of the slider 220 presses the rear inner wall of the case 10A. Thus, in a state in which the slider 220 is disposed in the space of the case 10A, the slider 220 is pressed forward and located on the front side in the case 10A.

Referring now to FIGS. 15A and 15B, the protrusions 230 of the slider 220 will be described in detail. As shown in FIGS. 15A and 15B, during the assembly of the braking device 1000, the slider 220 is located below the inside of the case 10A, and both are move relatively in the up-down direction so as to approach each other. Then, the protrusions 230 of the slider 220 are passed through the grooves 118 in the case 10A. Note that in FIG. 15A, the grooves 118 are emphasized to increase visibility. Then, as shown in FIGS. 5A to 5C, the case 10A and slider 220 approach each other until the protrusions 230 reach the support grooves 114. Then, the coil spring SP on the slider 220 contacts the rear inner wall of the case 10A and energizes the slider 220 in the front direction. Thus, the protrusions 230 are located ahead of the grooves 118. Thus, once the slider 220 is mounted on the case 10A, the protrusions 230 can be prevented from being disengaged from the support grooves 114. Not only during the assembly of the braking device 1000 but also during the disassembly thereof, the grooves 118 allow the protrusions 230 to be passed therethrough. In this case, the slider 220 is moved back relative to the case 10A against the energizing force of the coil spring SP; and when the protrusions 230 reach the positions of the grooves 118, the slider 220 is moved down relative to the case 10A.

According to this configuration, the slider 220 can be supported in the case 10A so as to be floating. Thus, it is possible to prevent the slider 220 from contacting another component, for example, the internal gear-provided carrier 260 and thus to reduce or eliminate unnecessary resistance. As a result, the wear in the members can be reduced.

2-1-4 Idle Roller 40, Knurled Roller 240, and Pinion Gear 50

Next, Referring to FIGS. 3A, 3B, and 16, the idle roller 40, knurled roller 240, and pinion gear 50 will be described. The idle roller 40 includes the roller 42 and shaft 41. The idle roller 40 has been described in detail in the first embodiment and therefore will not be described.

The knurled roller 240 corresponds to the roller 32 of the first embodiment. One end of the shaft 31 is inserted in the center of the knurled roller 240, and the other end thereof is inserted into the pinion gear 50. The knurled roller 240 may be formed of any material, for example, stainless steel.

Figure 10:
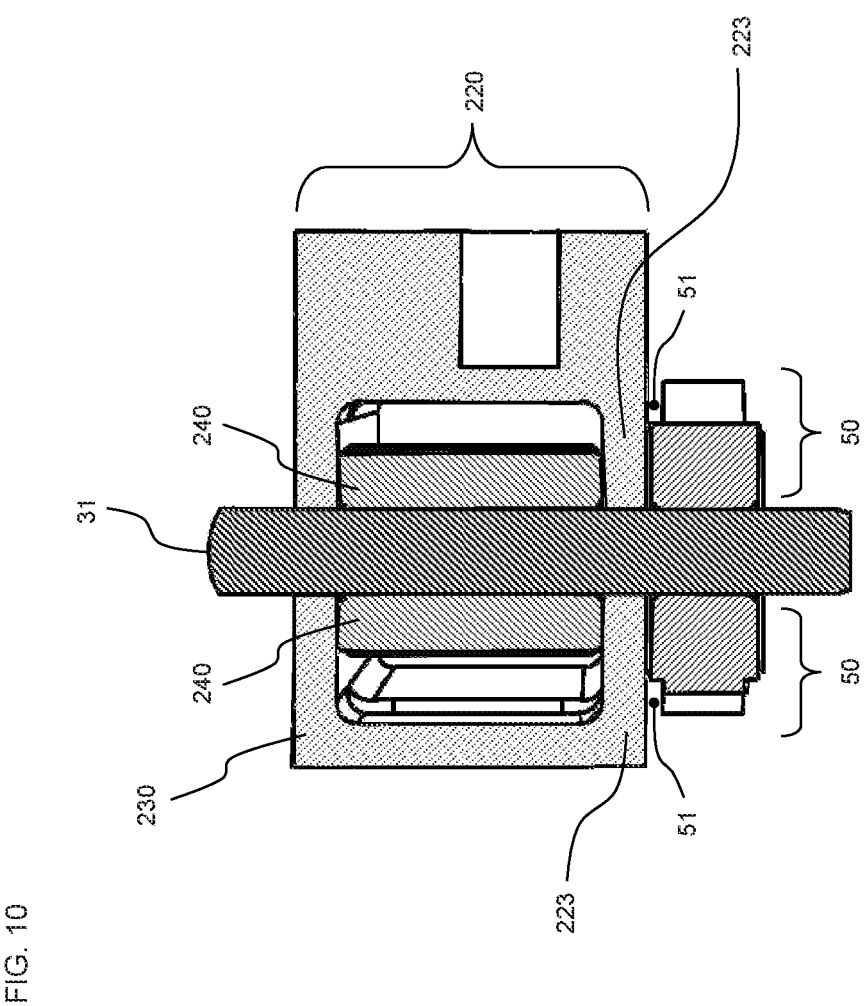
FIG. 10 is a sectional view showing the positional relationships between a knurled roller 240, a slider 220, and a pinion gear 50 of the second embodiment of the present invention and is a part of a sectional view passing through an approximate center of a shaft 31 seen from the left side surface of the braking device 1000.

As in the first embodiment, the idle roller 40 and knurled roller 240 are held in the slider 220. The pinion gear 50 is held outside the slider 220. Referring now to FIG. 10, the positional relationship between the knurled roller 240, slider 220, and pinion gear 50 will be described. FIG. 10 is a part of a sectional view passing through an approximate center of the shaft 31 seen from the left side surface of the braking device 1000 of the second embodiment. As shown in FIG. 10, during the assembly of the braking device 1000, the bottom wall 223 of the slider 220 is sandwiched between the knurled roller 240 and pinion gear 50. In the second embodiment, a step 51 for reducing the contact area between the pinion gear 50 and slider 220 is formed in the pinion gear 50. Thus, when the knurled roller 240 and pinion gear 50 rotate integrally through the shaft 31, the sliding resistance between the pinion gear 50 and slider 220 can be reduced, allowing them to rotate smoothly. Note that in the second embodiment, the washer 241 (see FIGS. 2A to 3B) is mounted on the shaft 31 below the pinion gear 50 to reduce the resistance.

2-1-5 Internal Gear-Provided Carrier 260 and Planetary Gears 280

Next, referring to FIGS. 2A, 3B, and 16, the internal gear-provided carrier 260 and planetary gears 280 will be described. In the second embodiment, the internal gear-provided carrier 260 is approximately doughnut-shaped in plain view. The internal gear-provided carrier 260 includes a flange 262 protruding outward from a cylinder 264 in plain view.

The inner circumferential surface of the cylinder 264 is provided with an internal gear 261 engaged with the pinion gear 50. The internal gear 261 corresponds to the inner circumferential gear 61 of the first embodiment. The flange 262 is provided with support shafts 263 protruding downward in the vertical direction. Any number of support shafts 263 may be disposed, but the support shafts 263 are preferably disposed at equal intervals. In the second embodiment, four support shafts 263 are disposed.

The planetary gears 280 are rotatably supported by the support shafts 263. The planetary gears 280 are engaged with a sun gear 323 (to be discussed later) and the inner circumferential gear 115 disposed in the case 10A. The planetary gears 280 can revolve around the center of the internal gear 261. Accordingly, when the rotation of the pinion gear 50 is transmitted to the internal gear 261, the internal gear-provided carrier 260 rotates. This rotation causes rotation of the planetary gears 280 rotatably supported by the support shafts 263 on the flange 262 of the internal gear-provided carrier 260. Thus, the rotation caused by the pinion gear 50 can be speeded up. The planetary gears 280 are provided with steps 281. The steps allow the planetary gears 280 to avoid contacting other members.

2-1-6 Sun Gear-Provided Weight Holder 320 and Weights 340

Next, the sun gear-provided weight holder 320 and weights 340 will be described with reference to FIGS. 2A, 2B, and 16. The sun gear-provided weight holder 320 includes a ring 324 and projections 321 and depressions 322 arranged outwardly alternately on the outside of the ring 324. As shown in FIGS. 2A and 2B, the outer circumferential surface of the ring 324 is provided with the sun gear 323 that is engaged with the planetary gears 280 and whose rotation axis is directed in a direction approximately perpendicular to the extending direction of the projections 321. The weights 340 are disposed in the depressions 322. That is, the sun gear-provided weight holder 320 can be said to be a member that holds the weights 340 in the depressions 322 having the projections 321 as boundaries during the assembly of the braking device 1000. Any number of weights 340 may be provided, but the weights 340 are preferably disposed at equal intervals in terms of the balance during rotation. In the second embodiment, eight weights 340 are disposed and therefore eight projections 321 and eight depressions 322 are provided.

In the second embodiment, the weights 340 have protrusions 341 on sides thereof close to the base 70. The protrusions 341 can reduce the resistance caused when the weights 340 contact the base 70. Any number of protrusions 341 may be disposed. In the second embodiment, four protrusions 341 are disposed.

Figure 4:
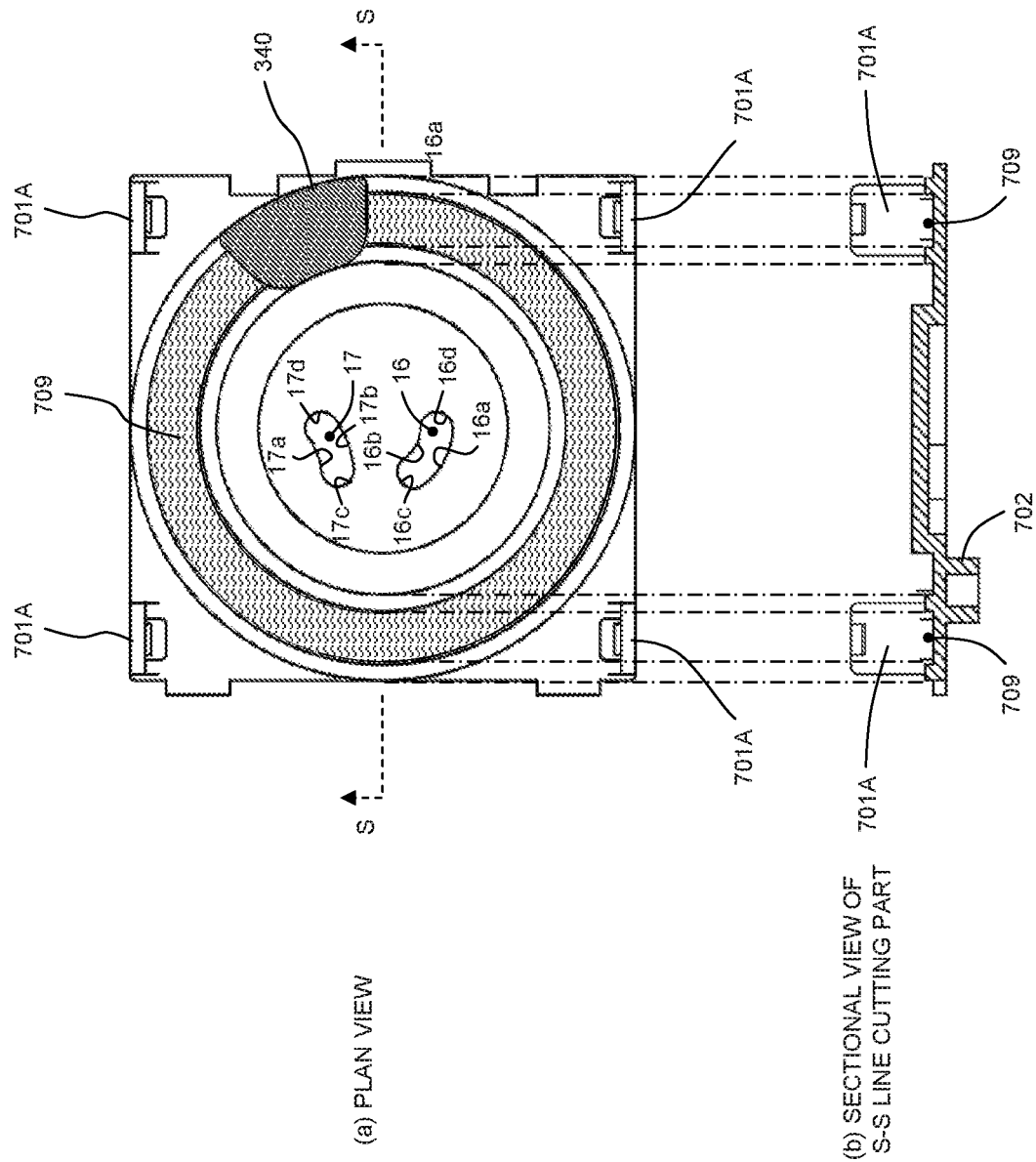
FIG. 4 is drawings showing an example in which grooves 709 are formed in a base instead of forming protrusions 341 on weights 340, in which (a) is a plan view; and (b) is a sectional view taken along line S-S.

Instead of disposing the protrusions 341 on the weights 340, a groove may be formed in the base 70. Such a groove also can reduce the resistance between the weights 340 and base 70. For example, as shown in FIG. 4, a lower groove 709 (a ring-shaped, hatched portion in FIG. 4) than adjacent portions may be formed in the bottom of the base 70, and the weights 340 may be disposed thereon. The resistance 709, without providing the protrusions 341 on the weights 340, can reduce the contact area between the weights 340 and base 70 and thus can reduce the resistance between the weights 340 and base 70.

When the weights 340 rotate due to the rotation of the pinion gear 50, the weights 340 move in a direction in which the weights 340 departs from the center of the internal gear 261, by centrifugal force and then contact the inner circumferential wall of the case 10A. Thus, the weights 340 give resistance serving as a centrifugal brake to the rotation. As a result, the inner circumferential wall of the case 10A, the sun gear-provided weight holder 320, and the weights 340 can produce effects similar to those of the resistance provider RA of the first embodiment. That is, in the braking device 1000 of the second embodiment, the mechanism corresponding to the movement converter DT and the mechanism corresponding to the resistance provider RA are disposed approximately vertically.

During the assembly of the braking device 1000, the internal gear-provided carrier 260 and sun gear-provided weight holder 320 are assembled with the plate 300 therebetween. Specifically, the internal gear-provided carrier 260 and sun gear-provided weight holder 320 are assembled such that the cylinder 264 of the internal gear-provided carrier 260 is inserted into the ring 324 of the sun gear-provided weight holder 320. Accordingly, the diameter of the cylinder 264 is designed so as to be slightly smaller than the diameter of the ring 324.

The plate 300 has a function of preventing inclination of the planetary gears 28, as well as preventing the interference between the planetary gears 280 and weights 340. To reduce the thickness of the entire braking device 1000, the weights 340 are preferably formed so as to be as thin as possible. While the plate 300 is preferably formed of a metal to obtain a thin plate, it may be formed of a resin if technically possible. In this case, the plate 300 may be formed integrally with the sun gear 323.

2-1-7 Base 70

Next, referring to FIGS. 2A to 3B, 6B, and 16, the base 70 will be described. As shown in FIGS. 2A to 3B, the base 70 has, in an approximate center thereof, a barrel 708 that is higher than adjacent portions and has a recessed lower portion. As shown in FIGS. 2A, 2B, and 6B, the upper surface of the barrel 708 is provided with a first base groove 706, a first guide wall 706A, a second base groove 707, and a second guide wall 707A.

The first base groove 706 and first guide wall 706A correspond to the first top wall groove 16 and first guide wall 7A, respectively, of the case 10A. The lower end of the shaft 31 is inserted in the first base groove 706 and is in contact with the first guide wall 706A formed on an edge of the first base groove 706. Similarly, the second base groove 707 and second guide wall 707A correspond to the second top wall groove 17 and second guide wall 8A, respectively, of the case 10A. The lower end of the shaft 41 is inserted in the second base groove 707 and is in contact with the second guide wall 707A formed on an edge of the second guide wall 707A.

The barrel 708 need not be necessarily provided. However, the disposition of the barrel 708 having the recessed lower portion can prevent the lower ends of the shafts 31, 41 from contacting the placement surface on which the braking device 1000 is placed and allows the lower ends of the shafts 31, 41 to be appropriately inserted.

The base 70 has two first engaging plates 701A on both edges of each of the left and right side surfaces thereof. The base 70 also has two second engaging plates 701B on both edges of the front side surface thereof and has one second engaging plate 701B in an approximate center of the rear side surface thereof. The first engaging plates 701A are engaged with the first engaging grooves 111A of the case 10A. The second engaging plates 701B are engaged with the second engaging grooves 111B of the case 10A. Thus, the case 10A and base 70 are engaged with each other, forming the cabinet.

As shown in FIGS. 3A, 3B, 6B, 16, and the like, the base 70 has, on the outer surface of the bottom thereof, a mounting tube 702 used to dispose the braking device 1000 in a head box (corresponding to the cabinet 106 in the first embodiment) of a shielding device. For example, by fitting the mounting tube 702 into a member, such as a shaft, disposed in the head box, the braking device 1000 can be stably disposed in the head box.

2-2 Assembly Configuration

Next, a state in which the above members are assembled will be described with reference to FIGS. 5A to 9B. FIGS. 5A and 5B are assembly drawings of the braking device 1000 obtained by assembling these members. As shown in FIGS. 5A and 5B, the braking device 1000 appears to consist of the cabinet where the case 10A and base 70 are connected together, and the arrangement member 200 disposed so as to cover the case 10A from above. This assembly is performed with the center axes of the respective members aligned in the up-down direction, as shown in FIGS. 2A to 3B. Specifically, the internal gear-provided carrier 260 and the sun gear-provided weight holder 320 holding the weights 340 are assembled with the plate 300 therebetween. At this time, the planetary gears 280 on the internal gear-provided carrier 260 and the sun gear 323 on the sun gear-provided weight holder 320 are engaged with each other.

Then, the shaft 31 is horizontally slid to the first top wall groove 226 and first bottom wall groove 228 in the slider 220 with the knurled roller 240 located inside the slider 220 and with the pinion gear 50 located outside the slider 220. Also, the shaft 41 is horizontally slid to the second top wall groove 227 and second bottom wall groove 229 with the roller 42 located inside the slider 220. Then, in order to engage the internal gear 261 on the internal gear-provided carrier 260 and the pinion gear 50 with each other, the slider 220 and internal gear-provided carrier 260 are move relatively so as to approach each other.

Then, the base 70 is disposed below these members and covered with the case 10A from above in such a manner that the protrusions 230 of the slider 220 are passed through the grooves 118 of the case 10A, as shown in FIG. 24. At this time, it is confirmed that the coil spring SP on the slider 220 is in contact with the inner circumferential wall of the case 10A, the slider 220 is energized in the front direction, and the protrusions 230 are not disengaged from the support grooves 114. Then, the case 10A and base 70 are fixed to each other by engaging the first engaging grooves 111A and second engaging grooves 111B in the case 10A and the first engaging plates 701A and second engaging plates 701B on the base 70 with each other.

Finally, the cabinet consisting of the case 10A and base 70 is covered with the arrangement member 200 from above. Then, the arrangement member 200 and case 10A are fixed to each other by engaging the nails 209 on the arrangement member 200 with the engaging holes 19 in the case 10A.

The braking device 1000 thus assembled is shown in FIGS. 5A to 5C. After the assembly of the braking device 1000 is complete, the first cord CD is disposed outside the front wall 205 of the arrangement member 200 and above the first front groove 201. Then, the second cord CD is inserted into the first front groove 201 of the arrangement member 200 through the first front cord insertion part 201A. Then, the third cord CD is inserted into the second front groove 202 through the second front cord insertion part 202A.

Then, these cords CD are passed through the guide grooves 113 formed in the front and rear side walls of the case 10A and the through holes 225 formed in the front and rear walls of the slider 220.

Then, of these cords CD, the first cord CD is passed so as to be located outside the rear wall 206 of the arrangement member 200 and above the first rear groove 203. Then, the second cord CD is drawn out of the first rear groove 203 of the rear wall 206 of the arrangement member 200 through the first rear cord insertion part 203A. Then, the third cord CD is drawn out of the second rear groove 204 through the second rear cord insertion part 204A. Thus, a state shown in FIGS. 5A and 5B is obtained.

FIG. 5C is a left side view of the braking device 1000, that is, a side view seen from the direction of an arrow X in FIG. 5A. As is seen in the side view of FIG. 5C, the case 10A, arrangement member 200, and base 70 are disposed in the braking device 1000 sequentially from above, and the protrusions 230 are supported by the support grooves 114.

As is seen in the plan view of FIG. 6A, the case 10A, the arrangement member 200, and a part of the base 70 are disposed in the braking device 1000 sequentially from the center. As is seen in FIGS. 5A, 5B, and 6A, the upper end of the shaft 31 passes through the first top wall groove 226 of the slider 220 and then the first top wall groove 16 of the case 10A and then exits the case 10A. Similarly, the upper end of the shaft 41 passes through the second top wall groove 227 of the slider 220 and then the second top wall groove 17 of the case 10A and then exits the case 10A.

The shaft 31 is in contact with the first guide wall 7A on the edge of the first guide wall 7A, and the shaft 41 is in contact with the second guide wall 8A on the edge of the second top wall groove 17.

As is seen in the bottom view of FIG. 6B, the lower end of the shaft 31 is inserted in the first base groove 706 of the base 70, and the lower end of the shaft 41 is inserted in the second base groove 707 thereof. Note that a portion corresponding to the barrel 708 of the surface on which the mounting tube 702 is disposed may be covered with a surface so that the lower ends of the shafts 31, 41 are not seen from outside.

2-2-2 Internal Structure in Assembled State Next, referring to FIGS. 7A to 9B, the internal structure in an assembled state will be described. FIG. 16 is a perspective view showing a state in which the arrangement member 200 and case 10A are removed from the assembled braking device 1000 shown in FIG. 14. As shown in FIGS. 7A and 7B, the shafts 31, 41 protrude upward from the slider 220. The movement of the shaft 31 in the first top wall groove 226 is limited to the width direction of the slider 220. Similarly, the movement of the shaft 41 in the second top wall groove 227 is limited to the width direction of the slider 220. Note that the cords CD (not shown) are inserted in the through holes 225 of the slider 220 in the front-rear direction of the slider 220 so as to be longitudinally arranged.

FIGS. 8A and 8B are perspective views showing a state in which the slider 220 is removed from the braking device 1000 shown in FIGS. 7A and 7B. The cords CD (not shown) are inserted in the front-rear direction of the braking device 1000 so as to be sandwiched between the knurled roller 240 and roller 42. The pinion gear 50 and internal gear 261 are engaged with each other. Accordingly, when tension is applied to the cords CD, friction occurs between the cords CD and knurled roller 240. Thus, the pinion gear 50 rotates integrally with the knurled roller 240, and the rotation of the pinion gear 50 is transmitted to the internal gear 261. As a result, the internal gear 261 rotates, and the support shafts 263 disposed on the flange 262 along with the internal gear-provided carrier 260 revolve. Thus, the planetary gears 280 rotatably supported by the support shafts 263 starts to revolve while rotating.

Figure 18:
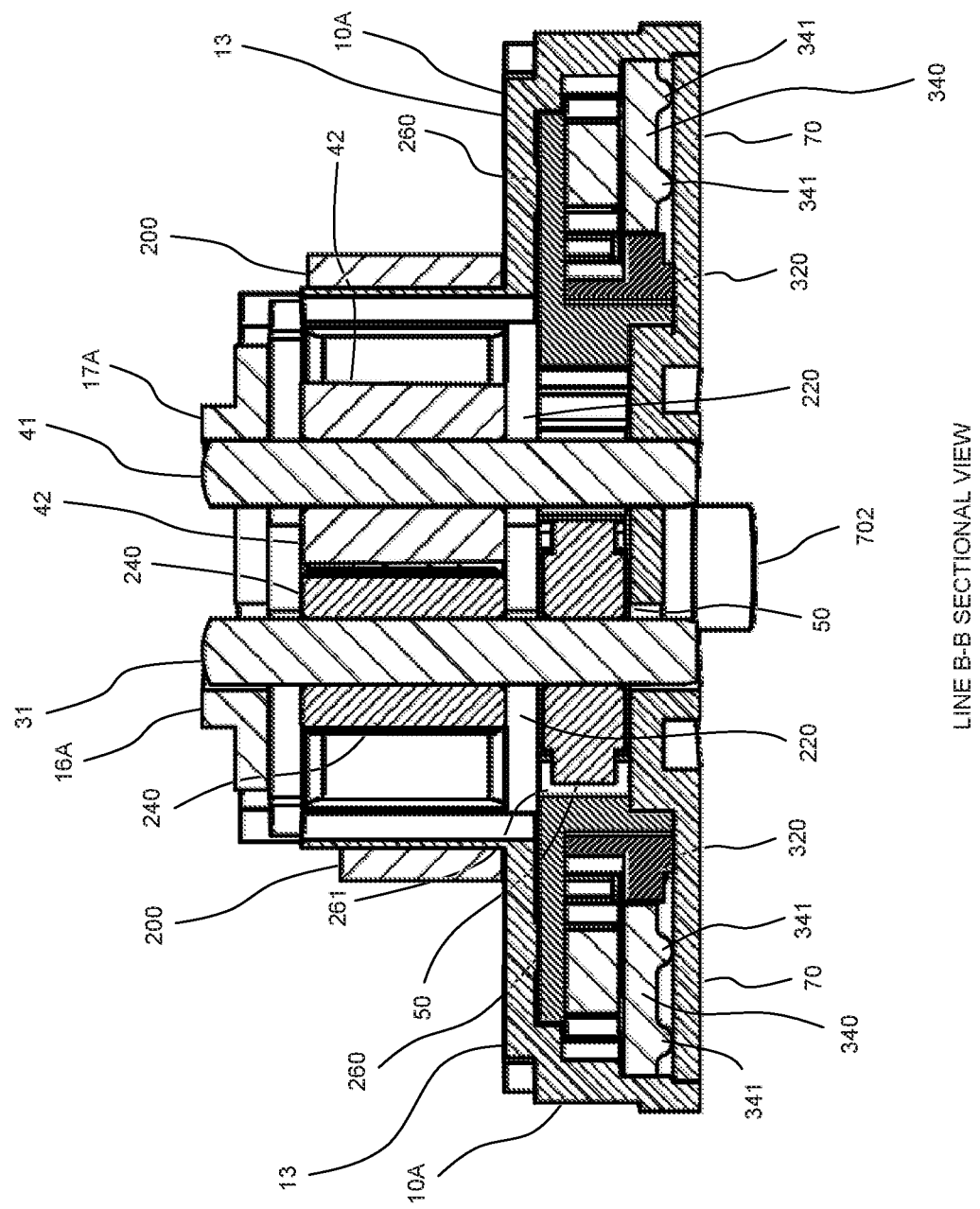
FIG. 18 is a sectional view taken along line B-B in FIG. 6A.

FIGS. 9A and 9B are perspective views showing a state in which the internal gear-provided carrier 260 is further removed from the braking device 1000 shown in FIG. 17. As shown in FIG. 18, the planetary gears 280 and sun gear 323 are engaged with each other. Accordingly, the rotation of the planetary gears 280 is transmitted to the sun gear 323, and the sun gear-provided weight holder 320 starts to rotate. As a result, as shown in FIG. 16, the weights 340 held by the depressions 322 of the sun gear-provided weight holder 320 start to rotate. Then, when the rotation speed exceeds a predetermined value, the weights 340 contact the inner wall of the case 10A by centrifugal force. Thus, resistance is given to the rotation of the knurled roller 240.

Next, referring to FIGS. 17 and 18, the positional relationships among the members of the assembled braking device 1000 will be described in detail. FIG. 17 is a sectional view taken along line A-A in FIG. 14. As shown in FIG. 17, the pinion gear 50 around the shaft 31 and the internal gear 261 on the internal gear-provided carrier 260 are engaged with each other. The rotation of the internal gear 261 is transmitted to the planetary gears 280 through the support shafts 263 of the internal gear-provided carrier 260. The planetary gears 280 are engaged with the sun gear 323 on the sun gear-provided weight holder 320 and the inner circumferential gear 115 in the case 10A. Accordingly, when rotation caused by the pinion gear 50 is transmitted to the planetary gears 280, the planetary gears 280 revolve around the central portion of the internal gear 261 within the space between the sun gear 323 and inner circumferential gear 115.

FIG. 18 is a sectional view taken along line B-B in FIG. 6A. As shown in FIG. 18, in the second embodiment, the line B-B sectional view is approximately symmetrical with respect to the mounting tube 702. The shaft 31 and shaft 41 protrude from the upper edge of the case 10A and the lower edge of the base 70. In the second embodiment, the upper edges of the first guide wall 7A and second guide wall 8A have approximately the same height as the upper ends of the shaft 31 and shaft 41.

The knurled roller 240 and roller 42 are located in the slider 220. The pinion gear 50 is located outside the slider 220 with the slider 220 between the pinion gear 50 and knurled roller 240. The pinion gear 50 and internal gear 261 are engaged with each other.

Portions from an upper portion to the collar 13 of the case 10A are covered by the arrangement member 200. The lower edge of the case 10A is engaged with the base 70. The weights 340 are held by an upper portion of the base 70. In the second embodiment, the weights 340 are detachable. Accordingly, the number or type of weights 340 may be changed in accordance with the required braking force. Specifically, if a greater braking force is required, the number of weights 340 may be increased, or weights having higher density may be held by the sun gear-provided weight holder 320. On the other hand, if the required braking force is small, the number of weights 340 may be reduced. Note that the weights 340 are preferably symmetrically disposed on the surface of the sun gear-provided weight holder 320 on which the weights 340 are to be held, in terms of stability during rotation. In the present embodiment, the protrusions 341 of the weights 340 and the bottom of the base 70 are in contact with each other and thus the resistance between the weights 340 and base 70 during rotation is reduced.

2-3 Operation

Next, referring to FIGS. 19A and 19B, the operation of the braking device 1000 of the second embodiment will be described. FIG. 19A is a drawing showing a state in which no tension is being applied to the cords CD (steady state). FIG. 19B is a drawing showing a state in which tension is being applied to the cords CD and the cords CD are sandwiched between the knurled roller 240 and roller 42 (sandwiched state). FIG. 19C is a table showing the rotation directions of the members when the state in FIG. 19A is changed to the state in FIG. 19B. As with FIG. 17, FIGS. 19A and 19B are sectional views taken along line A-A in FIG. 5C. For convenience, the circumference of the roller 42 which is not shown in the sectional views is shown so as to be overlaid on the perimeter of the shaft 41, and the circumference of the knurled roller 240 which is not shown in the sectional views is shown so as to be overlaid on the perimeter of the shaft 31. The circumference of the knurled roller 240 is not exactly circular, but is shown so as to be approximately circular for simplification.

As described above, in the steady state, the coil spring SP is in contact with the rear inner wall of the case 10A and is pressing the slider 220 forward, as shown in FIG. 19A. Accordingly, the slider 220 is located ahead of the case 10A. For this reason, the shaft 31 whose position is regulated by the first top wall groove 226 and first bottom wall groove 228 of the slider 220 and the shaft 41 whose position is regulated by the second top wall groove 227 and second bottom wall groove 229 thereof move forward along with the slider 220. The distance between the first top wall groove 16 and second top wall groove 17 of the case 10A held above the slider 220 is shorter in more front positions. Similarly, the distance between the first base groove 706 and second base groove 707 of the base 70 is shorter in more front positions. Accordingly, the distance between the roller 42 rotatably supported by the shaft 41 and the knurled roller 240 rotatably supported by the shaft 31 is shorter. Specifically, the first top wall groove 16 and first base groove 706 serve as regulation grooves into which the shaft 31 of the knurled roller 240 is movably fitted and that regulate the movement of the knurled roller 240 which is not along the grooves. Similarly, the second top wall groove 17 and second base groove 707 serve as regulation grooves into which the shaft 41 of the roller 42 is movably fitted and that regulate the movement of the roller 42 which is not along the grooves. Also, the first top wall groove 16 and first base groove 706 are formed so as to be concentric with the center point of the inner circumferential surface of the internal gear-provided carrier 260 in plan view. Thus, even if the shaft 31 moves in the grooves, the pinion gear 50 can be continuously engaged with the internal gear 261 on the internal gear-provided carrier 260.

As seen above, as the distance between the knurled roller 240 and roller 42 is reduced, the knurled roller 240 is pressed by the roller 42, and the cords CD are sandwiched between the knurled roller 240 and roller 42. That is, in the second embodiment, the coil spring SP also serves as an energizing member that always energizes the knurled roller 240 so that the knurled roller 240 is pressed by the roller 42.

Assume that tension is applied to the cords CD in the direction of an arrow D1 (forward) in the braking device 1000 in the steady state. At this time, due to the friction between the cords CD, and the knurled roller 240 and roller 42, the knurled roller 240 rotates counterclockwise, and the roller 42 rotates clockwise. Due to the rotation of the knurled roller 240, the pinion gear 50 fixed so as to share the same shaft 31 also rotates in the same direction (counterclockwise) as the knurled roller 240. At this time, as shown in FIG. 19B, the shaft 31 and shaft 41 move forward in plan view and are guided to a sandwiching guide slope 16a of the first top wall groove 16 and a sandwiching guide slope 17a of the second top wall groove 17, respectively, of the case 10A. Thus, the shaft 31 and shaft 41 approach each other in the left-right direction, and the cords CD are sandwiched between the knurled roller 240 and roller 42 with stronger force. The knurled roller 240 reliably rotates in accordance with the movement of the cords CD. Since the pinion gear 50 is engaged with the internal gear 261, the internal gear 261 rotates counterclockwise by a force given by the teeth of the pinion gear 50. The internal gear-provided carrier 260 also rotates counterclockwise along with the internal gear 261. Thus, the planetary gears 280 on the internal gear-provided carrier 260 also revolve counterclockwise. Since the planetary gears 280 are engaged with the inner circumferential gear 115 fixed by the sun gear 323 and case 10A, the planetary gears 280 revolve counterclockwise while rotating in a direction (clockwise) opposite to the revolving direction. Accordingly, the sun gear 323 engaged with the planetary gears 280 inside the planetary gears 280 rotates in a direction (counterclockwise) opposite to the rotation of the planetary gears 280. At this time, the rotation of the sun gear 323 is speeded up by the planetary gears 280. Thus, the weights 340 held by the sun gear-provided weight holder 320 that rotates with the sun gear 323 also start to rotate. Since the case 10A and base 70 are fixed, the inner circumferential gear 115 engaged with the planetary gears 280 outside the planetary gears 280 does not rotate even during the rotation of the planetary gears 280.

Then, as shown in FIG. 19B, when the knurled roller 240 and roller 42 approach the limit (sandwiched state), the knurled roller 240 stops the movement thereof along the internal gear 261 although it continuously rotates. At this time, the rotation of other members caused by the rotation of the knurled roller 240 continues. Then, when the weights 340 contact the inner wall of the case 10A by centrifugal force, resistance against the rotation occurs. Specifically, as the moving speed of the cords CD increases, the rotation speed increases and thus the centrifugal force increases. Due to the increase in the centrifugal force, the weights 340 contact the inner wall of the case 10A more strongly, increasing the resistance. Thus, the moving speed of the cords CD (the fall speed of the sunlight shielding member) can be suppressed. If approximately constant tension is applied to the cords CD (e.g., if a sunlight shielding member suspended from the front cord CD of the braking device 1000 so as to be able to be raised and lowered falls freely in FIG. 1 of the first embodiment), the moving speed of the cords CD becomes approximately constant when a balance is struck between the tension applied to the cords CD and the resistance between the weights 340 and the inner circumferential wall of the case 10A. Thus, the braking device 1000 serves as a rotary damper against the movement of the cords CD and is able to lower the sunlight shielding member slowly.

FIG. 19C is a table showing the rotation directions of the members (the rotation direction of the pinion gear 50 additionally includes the front-rear direction and fastening direction in plan view) when the steady state is changed to the sandwiched state.

On the other hand, if tension is applied to the cords CD in a direction (backward) opposite to the direction of the arrow D1, the knurled roller 240 and roller 42 rotate in a direction opposite to the above direction. As a result, the shaft 31 and shaft 41 are guided to a release guide slope 7B of the first top wall groove 16 and a release guide slope 8B of the second top wall groove 17, respectively, and thus move so as to depart from each other. Thus, the sandwiching force of the knurled roller 240 acting on the cords CD is weakened so that the cords CD can be pulled by a weak force. For this reason, if the braking device 1000 is disposed in the head box as shown in FIG. 1, it is preferred to set the direction in which tension is applied to the cords CD in the front direction in FIG. 28 to the sunlight shielding member lowering direction and to set the direction in which tension is applied to the cords CD in the rear direction in FIG. 28 to the sunlight shielding device raising direction.

Next, referring to FIGS. 29A and 29B, the movement of the slider 220 when the steady state is changed to the sandwiched state will be described. (a) corresponds to FIG. 19A, and (b) corresponds to FIG. 19B.

When the steady state in (a) is changed to the sandwiched state in (b), the shaft 41 and roller 42, and the shaft 31 and knurled roller 240 move in the front direction in the drawings due to the friction between these members and the cords CD. At this time, the shaft 41 is in contact with the second top wall groove 227 and second bottom wall groove 229. Accordingly, a forward force is applied to the second top wall groove 227 and second bottom wall groove 229 as the shaft 41 moves forward. Similarly, the shaft 31 is in contact with the first top wall groove 226 and first bottom wall groove 228. Accordingly, a forward force is applied to the first top wall groove 226 and first bottom wall groove 228 as the shaft 31 moves forward. Accordingly, when the shafts 31, 41 move forward by Δ, the slider 220 also moves forward by Δ.

While, in the second embodiment, the weights 340 are held by the sun gear-provided weight holder 320, the weights 340 may be held using any other method. For example, the weights 340 may be held by the internal gear-provided carrier 260. In this case, the planetary gears 280, plate 300, and sun gear-provided weight holder 320 may be omitted. Note that if the planetary gears 280 are omitted, the effect of speeding up the rotation of the sun gear 323, sun gear-provided weight holder 320, and weights 340 would not be obtained.

As seen above, the braking device 1000 of the second embodiment can be said to be a brake configured to change the sandwiched state so that the cords are sandwiched by the sandwiching object when the cords and sandwiching object move relatively in one direction and the cords are released in a non-bent state when the cords and sandwiching object move relatively in another direction. As used herein, the term "the cords are released" refers to a state in which the cords are allowed to move, and the cords and sandwiching object may be in contact with each other or may be in non-contact with each other.

As described above, the braking device 1000 of the second embodiment can be said to be a brake that brakes movement of a cord and includes a movement converter configured to convert movement of a cord into movement of another member, wherein the movement converter includes sandwiching object configured to allow the cord to be sandwiched, and the sandwiching object are configured to change a sandwiched state so that the cord is sandwiched by the sandwiching object when the cord and the sandwiching object move relatively in one direction and the cord is released in a non-bent state when the cord and the sandwiching object move relatively in another direction.

The braking device 1000 further includes a resistance provider configured to, when the cord moves relatively in the one direction, generate resistance in association with movement of the cord.

The sandwiching object of the braking device 1000 includes a roller disposed in a position in which the roller can contact the cord and configured to be movable in a predetermined range and a sandwiching member disposed so that the cord is sandwiched between the sandwiching member and the roller. The roller is configured to move to a first position when the cord and the roller moves relatively in one direction and to move to a second position when the cord and the roller moves relatively in another direction.

In the braking device 1000, the cord is sandwiched between the roller and the sandwiching member when the roller is located in the first position and the cord is released in a non-bent state when the roller is located in the second position.

In the braking device 1000, the roller is configured to move so that friction acting between the roller and the cord when the roller is located in the second position becomes smaller than friction acting between the roller and the cord when the roller is located in the first position.

In the braking device 1000, when the roller is located in the first position, rotation of the roller caused by movement of the cord is outputted to the resistance provider, and when the roller is located in the second position, rotation of the roller caused by movement of the cord is not outputted to the resistance provider.

Advantageous Effects

The braking device 1000 of the second embodiment are able to produce the following advantageous effects:

(1) The cords CD are not bent when they move freely. Thus, the bending resistance can be reduced, and the cords CD can move more smoothly.

(2) The friction between the sandwiching object and cords CD is changed due to the displacement of the sandwiching object (knurled roller 240 and roller 42). Thus, the cords CD are released in a non-bent state.

(3) A selection as to whether the rotation caused by the movement of the cords CD is transmitted to the resistance provider RA is made in accordance with the displacement of the sandwiching object (knurled roller 240 and roller 42). Thus, the cords CD are released in a non-bent state.

(4) The operation force required to pull the cords can be reduced. Also, the cords CD can be reliably sandwiched during automatic operation (automatic fall) and thus an unintended fall can be prevented.

(5) If forward tension is applied to the cords CD, the knurled roller 240 and roller 42 move so as to approach each other. Thus, the cords CD can be sandwiched strongly, and the knurled roller 240 can be rotated reliably so that the rotation can be transmitted to the pinion gear 50.

(6) If rear tension is applied to the cords CD, the knurled roller 240 and roller 42 move so as to depart from each other. Thus, the sandwiching force acting on the cords CD can be weakened so that the cords CD are allowed to move freely.

(7) The regulation grooves formed in the cabinet (case 10A and base 70) can prevent the knurled roller 240 and roller 42 from moving in an unintended direction.

(8) Since the slider 220 is held in a floating state, it is possible to reduce the resistance and to suppress the wear in the members.

(9) Since the waveform part 116 and step 117 are disposed in the case 10A, the friction resistance can be reduced.

(10) The protrusions 341 disposed on the weights 340 can reduce the resistance.

(11) The plate 300 can prevent the inclination of the planetary gears 280 and also can prevent the interference between the planetary gears 280 and weights 340.

(12) The first guide wall 7A and second guide wall 8A can prevent the case 10A from being shaved due to the pressure from the shafts 31, 41.

(13) The step 51 disposed on the pinion gear 50 can reduce the sliding resistance between the pinion gear 50 and slider 220.

(14) Since the weights 340 are detachable, the number or type of weights 340 can be changed in accordance with the required braking force.

(15) Since the mechanism corresponding to the movement converter DT and the mechanism corresponding to the resistance provider RA are disposed approximately vertically, the area of the entire braking device 1000 in plan view can be reduced.

Figure 21:
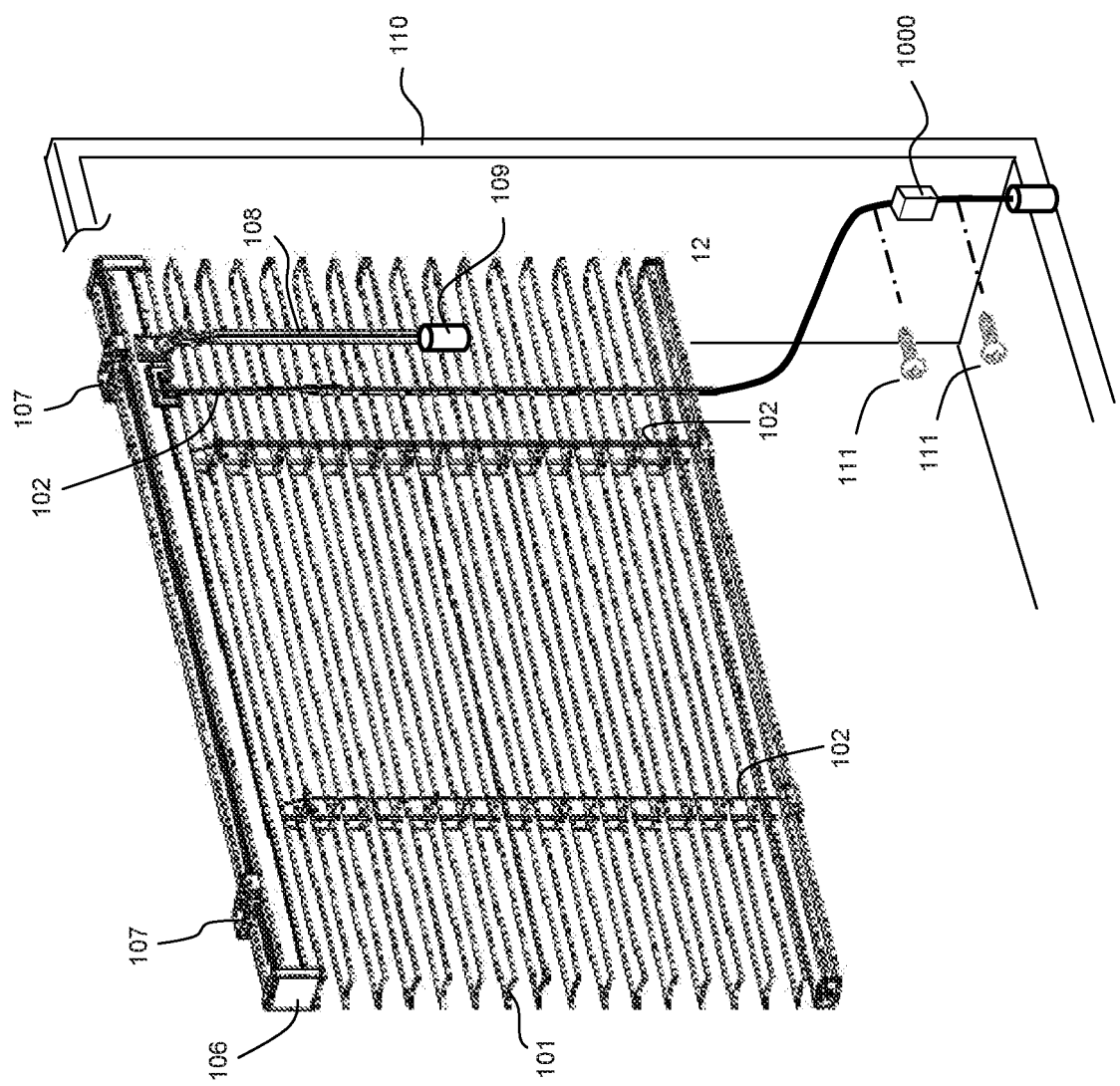
FIG. 21 is a drawing showing a mounting position for the braking devices of the embodiments of the present invention.

While the braking devices of the embodiments of the present invention have been described, the brakes may be mounted in any position. Instead of disposing the braking device 1000 in the head box, as shown in FIG. 1 of the first embodiment, the braking device 1000 may be fixed to the window frame 110 using the screws 111 or the like, as shown in FIG. 21. Or, the braking device 1000 may be disposed in the grip 109. Or, the braking device 1000 may be disposed in any location along the path through which the hoisting cord 102 is passed.

INDUSTRIAL APPLICABILITY

As described above, the present invention provides braking devices configured to release cords in a non-bent state so that the operation force required to pull the cords is reduced and the behavior of slats is stabilized during an automatic fall, and a sunlight shielding device using any one of the braking devices. The braking devices and sunlight shielding device can be used in the field of daily necessaries or the like.

DESCRIPTION OF REFERENCE NUMERALS 10A to 10C: case, 31, 41: shaft, 50: pinion gear, 70: base, 200: arrangement member, 220: slider, 240: knurled roller, 260: internal gear-provided carrier, 280: planetary gear, 300: plate, 320: sun gear-provided weight holder, 340: weight

The invention claimed is:

1. A shielding device comprising:
a sunlight shielding member suspended so as to be able to be raised and lowered in accordance with movement of cords; and
a braking device for braking movement of the cords, wherein
the braking device comprises
a sandwiching object configured to allow the cords to be sandwiched, wherein
the sandwiching object is configured to change a sandwiched state so that the sandwiching object sandwiches the cords and brakes the movement of the cords without stopping the movement of the cord when the cords move relatively to the sandwiching object in one direction due to a self-weight of the sunlight shielding member and the sandwiching object releases the cord in a non-bent state as a result of the cords moving relatively to the sandwiching object in another direction.

2. The shielding device of claim 1, further comprising a resistance provider configured to, when the cord moves relatively in the one direction, generate resistance in association with movement of the cord.

3. The shielding device of claim 1, wherein the sandwiching object comprises:
a roller disposed in a position in which the roller can contact the cord and configured to be movable in a predetermined range; and
a sandwiching member disposed so that the cords are sandwiched between the sandwiching member and the roller, and
the roller is configured to move to a first position when the cords and the roller move relatively in the one direction and to move to a second position when the cords and the roller move relatively in the other direction.

4. The shielding device of claim 3, wherein the roller is configured to be always kept in contact with the cords between the first position and the second position.

5. The shielding device of claim 3, wherein the braking device comprises an energizer configured to energize the roller so that the roller moves in a direction in which the roller contacts the cords.

6. The shielding device of claim 3, wherein
the cords are sandwiched between the roller and the sandwiching member when the roller is located in the first position, and
the cords are released in a non-bent state when the roller is located in the second position.

7. The shielding device of claim 6, wherein
the roller is configured to move so that friction acting between the roller and the cords when the roller is located in the second position becomes smaller than friction acting between the roller and the cords when the roller is located in the first position.

8. The shielding device of claim 7, the braking device further comprising a resistance provider configured to provide rotational resistance to the roller, wherein
the roller is configured to be rotatable in accordance with movement of the cords in the one direction, and the roller continuously transmits rotation to the resistance provider even if the roller moves from the first position to the second position.

9. The shielding device of claim 6, further comprising a resistance provider configured to, when the cords move relatively in the one direction, generate resistance in association with movement of the cords, wherein
when the roller is located in the first position, rotation of the roller caused by movement of the cords is outputted to the resistance provider, and
when the roller is located in the second position, rotation of the roller caused by movement of the cords is not outputted to the resistance provider.

10. The shielding device of claim 9, wherein the roller transmits rotation to the resistance provider through a transmitter when the roller is located in the first position.

11. The shielding device of claim 6, the braking device further comprising:
- an output member configured to rotate in the first position in association with rotation of the roller, and
- a resistance provider configured to generate resistance in association with rotation of the output member.

12. A shielding device comprising:
- a sunlight shielding member suspended so as to be able to be raised and lowered in accordance with movement of cords; and
- a braking device for braking movement of the cords, wherein
the braking device comprises:
- a sandwiching object configured to allow the cords to be sandwiched, wherein
the sandwiching object is configured to move along a moving direction of the cord so as to approach the cords and brakes the movement of the cords without stopping the movement of the cords when the cords move due to a self-weight of the sunlight shielding member.

\* \* \* \* \*